(12) United States Patent
Suzuki et al.

(10) Patent No.: US 11,771,994 B2
(45) Date of Patent: Oct. 3, 2023

(54) STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

(71) Applicant: NINTENDO CO., LTD., Kyoto (JP)

(72) Inventors: Ryosuke Suzuki, Kyoto (JP); Masaki Wada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/703,084

(22) Filed: Mar. 24, 2022

(65) Prior Publication Data
US 2022/0212111 A1 Jul. 7, 2022

Related U.S. Application Data

(63) Continuation of application No. 16/783,405, filed on Feb. 6, 2020, now Pat. No. 11,311,809.

(30) Foreign Application Priority Data

Jul. 5, 2019 (JP) ................... 2019-126193

(51) Int. Cl.
*A63F 13/65* (2014.01)
*A63F 13/816* (2014.01)
(Continued)

(52) U.S. Cl.
CPC ............ *A63F 13/65* (2014.09); *A63F 13/211* (2014.09); *A63F 13/428* (2014.09); *A63F 13/58* (2014.09); *A63F 13/816* (2014.09); *A63F 13/833* (2014.09)

(58) Field of Classification Search
CPC ...... A63F 13/212; A63F 13/428; A63F 13/58; A63F 13/65; A63F 13/816; A63F 13/833; A63F 2300/1012; A63F 2300/8029
See application file for complete search history.

(56) References Cited

U.S. PATENT DOCUMENTS 3,610,622 A * 10/1971 Haroski ................. A63B 67/10
446/28
4,542,897 A 9/1985 Melton
(Continued)

FOREIGN PATENT DOCUMENTS

JP H08131654 A * 5/1996 ....... A63F 2300/800
JP H10509058 A * 9/1998 ......... A63B 23/1209
(Continued)

OTHER PUBLICATIONS

"The world's first VR gym is opening in San Francisco. We tried it." by Michelle Robertson, published Mar. 20, 2019. Source: https://www.sfgate.com/tech/article/worlds-first-virtual-reality-gym-vr-black-box-13701230.php (Year: 2019).*
(Continued)

*Primary Examiner* — Steven J Hylinski
(74) *Attorney, Agent, or Firm* — Nixon & Vanderhye PC

(57) ABSTRACT

An example of an information processing apparatus acquires action data based on an output of a sensor according to a fitness action performed by a player, and executes a game event. In the game event, the information processing apparatus designates at least one type of fitness event from among a plurality of types of fitness events. Each fitness event causes the player to perform a fitness action. During the game event, the information processing apparatus executes a fitness event that causes the player to perform a fitness action corresponding to the designated fitness event until an ending condition is satisfied. The information processing apparatus determines whether or not the achieve-
(Continued)

ment condition has been satisfied, based on the action data acquired during the fitness event. The information processing apparatus repeats designation and execution of the fitness event until it is determined that the achievement condition has been satisfied.

20 Claims, 25 Drawing Sheets

(51) Int. Cl.
A63F 13/211 (2014.01)
A63F 13/428 (2014.01)
A63F 13/58 (2014.01)
A63F 13/833 (2014.01)

(56) References Cited

U.S. PATENT DOCUMENTS

| | | | |
|---|---|---|---|
| 4,630,817 A * | 12/1986 | Buckley | G06F 3/0334 463/7 |
| 4,702,475 A | 10/1987 | Elstein | |
| 4,711,543 A * | 12/1987 | Blair | G09B 5/065 352/52 |
| 4,915,384 A | 4/1990 | Bear | |
| 4,976,435 A | 12/1990 | Shatford | |
| 5,001,632 A | 3/1991 | Hall-Tipping | |
| 5,362,069 A | 11/1994 | Hall-Tipping | |
| 5,524,637 A | 6/1996 | Erickson | |
| 5,616,078 A | 4/1997 | Oh | |
| 5,667,459 A | 9/1997 | Su | |
| 5,823,779 A | 10/1998 | Muehle | |
| 5,947,868 A | 9/1999 | Dugan | |
| 5,989,157 A | 11/1999 | Walton | |
| 6,024,675 A | 2/2000 | Kashiwaguchi | |
| 6,213,872 B1 | 4/2001 | Harada | |
| 6,283,861 B1 * | 9/2001 | Kawai | A63F 13/57 463/43 |
| 6,302,792 B1 | 10/2001 | Arai | |
| 6,308,565 B1 | 10/2001 | French | |
| 6,430,997 B1 | 8/2002 | French | |
| 6,712,737 B1 | 3/2004 | Nusbaum | |
| 6,727,884 B1 | 4/2004 | Leatham | |
| 7,163,489 B1 | 1/2007 | Nelson | |
| 8,100,770 B2 * | 1/2012 | Yamazaki | A63F 13/23 463/40 |
| 8,454,437 B2 | 6/2013 | Dugan | |
| 8,747,199 B1 | 6/2014 | Palmisano | |
| 8,762,102 B2 | 6/2014 | Yuen | |
| 8,858,331 B2 | 10/2014 | Song | |
| 9,533,228 B2 | 1/2017 | Dugan | |
| 9,700,802 B2 | 7/2017 | Dugan | |
| 2002/0118163 A1 * | 8/2002 | Rozas | G06F 3/011 345/156 |
| 2002/0160883 A1 * | 10/2002 | Dugan | A63B 24/0062 482/8 |
| 2004/0063549 A1 * | 4/2004 | Kuo | A63B 71/0622 482/57 |
| 2005/0209066 A1 * | 9/2005 | Penney | A63F 13/214 482/84 |
| 2005/0215319 A1 * | 9/2005 | Rigopulos | A63F 13/45 463/32 |
| 2007/0111858 A1 | 5/2007 | Dugan | |
| 2007/0197274 A1 | 8/2007 | Dugan | |
| 2008/0102424 A1 * | 5/2008 | Holljes | A63B 21/4034 434/247 |
| 2009/0023554 A1 | 1/2009 | Shim | |
| 2009/0098979 A1 * | 4/2009 | Coshott | A63F 13/23 482/4 |
| 2009/0098980 A1 * | 4/2009 | Waters | A63B 22/02 463/43 |
| 2009/0144020 A1 | 6/2009 | Ohta et al. | |
| 2009/0270743 A1 | 10/2009 | Dugan | |
| 2010/0203967 A1 * | 8/2010 | Chiu | G16H 20/30 463/32 |
| 2010/0240458 A1 | 9/2010 | Gaiba | |
| 2011/0065504 A1 * | 3/2011 | Dugan | A63F 13/42 463/31 |
| 2011/0130183 A1 * | 6/2011 | Pelletter | A63F 13/10 463/7 |
| 2012/0020649 A1 | 1/2012 | Vanderkaden | |
| 2012/0252580 A1 | 10/2012 | Dugan | |
| 2012/0253489 A1 | 10/2012 | Dugan | |
| 2013/0288761 A1 * | 10/2013 | Santos Paiva Ferraz Conceicao | A63F 13/217 463/7 |
| 2014/0011640 A1 * | 1/2014 | Dugan | A63B 24/00 482/8 |
| 2014/0081432 A1 * | 3/2014 | Kingon | G16H 20/30 700/90 |
| 2014/0155129 A1 * | 6/2014 | Dugan | A63B 24/00 463/7 |
| 2014/0188009 A1 | 7/2014 | Lange | |
| 2014/0274564 A1 * | 9/2014 | Greenbaum | A63B 21/225 482/5 |
| 2014/0309083 A1 * | 10/2014 | Dugan | A63B 24/00 482/9 |
| 2015/0081057 A1 | 3/2015 | Hamada et al. | |
| 2015/0138099 A1 * | 5/2015 | Major | H04W 4/027 345/173 |
| 2015/0151162 A1 * | 6/2015 | Dugan | A63F 13/816 482/8 |
| 2015/0157938 A1 * | 6/2015 | Domansky | A61B 5/4848 463/7 |
| 2016/0151670 A1 * | 6/2016 | Dugan | A63B 24/00 482/8 |
| 2016/0317869 A1 * | 11/2016 | Dugan | A63F 13/335 |
| 2017/0106242 A1 * | 4/2017 | Dugan | A63B 24/0062 |
| 2018/0064991 A1 * | 3/2018 | Yanev | A63B 21/4013 |
| 2018/0200577 A1 * | 7/2018 | Dugan | A63F 13/10 |
| 2018/0256074 A1 * | 9/2018 | Persidsky | A61B 5/113 |
| 2019/0076701 A1 * | 3/2019 | Dugan | A63B 24/00 |
| 2019/0126145 A1 | 5/2019 | Lowery | |
| 2021/0001226 A1 | 1/2021 | Suzuki et al. | |
| 2021/0038982 A1 * | 2/2021 | Guillemette | A63F 13/428 |
| 2021/0308579 A1 | 10/2021 | Suzuki et al. | |

FOREIGN PATENT DOCUMENTS

| | | | |
|---|---|---|---|
| JP | 3694267 B2 * | 9/2005 | A63B 22/0605 |
| JP | 2009-134572 | 6/2009 | |
| JP | 2011-67435 | 4/2011 | |
| JP | WO2014/038049 | 3/2014 | |
| JP | 6210997 | 10/2017 | |
| WO | 2009/031294 | 3/2009 | |
| WO | 2013/078208 | 5/2013 | |
| WO | WO-2013078208 A2 * | 5/2013 | A61B 5/0205 |
| WO | WO-2013131323 A1 * | 9/2013 | A63F 13/10 |
| WO | WO-2018057044 A1 * | 3/2018 | |

OTHER PUBLICATIONS

"CES 2018 Hands-On: Black Box VR Gave Me A Real Workout," by David Jagneaux, published Jan. 15, 2018. Source: https://uploadvr.com/ces-2018-hands-on-black-box-vr-gave-me-a-real-workout/ (Year: 2018).*
"Getting fighting fit in San Francisco's virtual reality gym," by Tommy Collison, published Jun. 27, 2019. Source: https://www.independent.ie/business/technology/tech-gaming/getting-fighting-fit-in-san-franciscos-virtual-reality-gym-38257350.html (Year: 2019).*
Various Monsters: Defeat the enemy on the rhythm!, Octoba, Aug. 3, 2014, [online] [searched on Dec. 6, 2019], URL, https:/octoba.net/archives/20140803-android-game-various-monsters-349329.hmtl (7 pages).
Office Action dated Jan. 9, 2020 in Japanese Application No. 2019-126193 (6 pgs.) with its machine translation (8 pgs.).
Soh Masuko, et al., "Heart Rate Control Method for Fitness Games", IPSJ Research Report No. 18, IPSJ SIG Technical Reports, Japan, Mar. 2, 2007 (9 pages).

(56) References Cited

OTHER PUBLICATIONS

Office Action, Notification of Reasons for Refusal dated Jun. 25, 2020 issued in Japanese Application No. 2019-126193 (6 pages) with machine translation (2 pages).
"A Fitness Game Reflecting Heart Rate", by Soh Masuko and Junichi Hoshino at the University of Tsukuba, Japan. Published in ACE Jun. 14-16, 2006. (Year: 2006).
U.S. Appl. No. 17/703,110, filed Mar. 24, 2022; Suzuki et al.
Notice of Reasons for Refusal dated Feb. 14, 2023 for Japanese Patent Application No. 2020-138741 and its machine translation in English, 8 pages.
"Super Monkey Ball", "Sonic", "BLEACH"—an experience report of the Wii title of Sega, Netorabo [online], Oct. 26, 2006, https://nlab.itmedia.co.jp/games/articles/0610/26/news005_4.html, [date of search: Feb. 6, 2023], 7 pages.

* cited by examiner

Fig.21

| GAME PROGRAM |
|---|
| FITNESS ACTION CONTENT DATA |
| PHYSICAL INFORMATION DATA |
| PLAYER PARAMETER DATA |
| PLAYER CHARACTER DATA |
| ENEMY CHARACTER DATA |

STORAGE MEDIUM HAVING INFORMATION PROCESSING PROGRAM STORED THEREIN, INFORMATION PROCESSING SYSTEM, INFORMATION PROCESSING APPARATUS, AND INFORMATION PROCESSING METHOD

CROSS REFERENCE TO RELATED APPLICATION

This application is a continuation of U.S. application Ser. No. 16/783,405 filed Feb. 6, 2020, which claims priority to Japanese Patent Application No. 2019-126193 filed on Jul. 5, 2019, the entire contents of each of which are hereby incorporated herein by reference.

FIELD

The disclosure shown here relates to a storage medium having stored therein an information processing program for executing a game, an information processing system, an information processing apparatus, and an information processing method.

BACKGROUND AND SUMMARY

Conventionally, an information processing program for executing a game that urges a player to perform a fitness action has been known. For example, a game that urges a player to perform stepping simulating jogging has been known.

In the game that urges a player to perform a fitness action as described above, there is room for improvement in motivating the player to perform the fitness action.

Therefore, the present application discloses a storage medium having an information processing program stored therein, an information processing system, an information processing apparatus, and an information processing method capable of motivating a player to perform a fitness action.

(1)

An example non-transitory computer-readable storage medium described herein has stored therein an information processing program executed by one or more processors of an information processing apparatus. The information processing program causes the one or more processors to execute: acquiring action data based on an output of a sensor according to a fitness action performed by a player; and executing a game event in which an achievement condition is set. Executing the game event includes: designating at least one type of fitness event from among a plurality of types of fitness events, each fitness event causing the player to perform a fitness action; during the game event, executing a first fitness event that causes the player to perform a fitness action corresponding to the designated fitness event until an ending condition is satisfied; and determining whether or not the achievement condition has been satisfied, based on the action data acquired during the first fitness event. Designation and execution of the first fitness event are repeated until it is determined that the achievement condition has been satisfied.

According to the configuration of above (1), since the player is caused to perform the fitness action with a goal of achieving the game event, the player can be motivated to perform the fitness action.

(2)

Designation of a fitness event that has been designated a predetermined number of times may be restricted until a condition for making the fitness event able to be designated again is satisfied.

According to the configuration of above (2), the likelihood that the player gets tired through performing only a specific fitness action, can be reduced.

(3)

The condition for making the fitness event able to be designated again may include at least one of a condition regarding an elapsed time from when the fitness event was executed last as the first fitness event, and a condition regarding the number of times another fitness event different from the fitness event has been executed as the first fitness event after the last execution of the fitness event as the first fitness event.

According to the configuration of above (3), it is possible to set the condition such that a sufficient time is ensured from when the player performs a certain fitness action to when the fitness action becomes able to be designated again. Thus, the likelihood that the player gets tired through performing only a specific fitness action, can be reduced with higher reliability.

(4)

The condition for making the fitness event able to be designated again may be set for each type of the fitness event.

According to the configuration of above (4), an appropriate condition according to the type of the fitness action can be set.

(5)

Based on a selection instruction performed by the player, at least one type of fitness event may be designated among the plurality of types of fitness events.

According to the configuration of above (5), the player can selectively perform his/her desired fitness action.

(6)

The game event may be a battle event of fighting a battle against an enemy character. Executing the game event may include executing an attack event of attacking the enemy character in response to the fitness action performed by the player during the first fitness event. As the achievement condition, whether or not a condition regarding a vitality value of the enemy character has been satisfied may be determined.

According to the configuration of above (6), since the player can be caused to perform the fitness action toward a goal, on the game, of satisfying the condition regarding the vitality value of the enemy character (e.g., defeating the enemy character), the player can be more strongly motivated to perform the fitness action.

(7)

Executing the game event may further include: executing a second fitness event that causes the player to perform a predetermined fitness action during the battle event; and executing a defense event of defending against an attack from the enemy character in response to the fitness action performed by the player during the second fitness event.

According to the configuration of above (7), since the player performs the fitness action regarding both an attack and a defense in the battle event, the opportunity of causing the player to perform the fitness action can be increased.

(8)

The second fitness event may be determined independently of an instruction of the player.

According to the configuration of above (8), the game, in which the player character defends against the attack from the enemy character, can be performed in a good tempo.

(9)

Executing the game event may include: decreasing a vitality value corresponding to the player in response to the fitness action performed by the player during the second fitness event; and ending the battle event upon determining that the player has been defeated in the battle event, in a case where the vitality value corresponding to the player satisfies a predetermined condition.

According to the configuration of above (9), the player can be caused to perform the fitness action while allowing the player to enjoy the sense of tension that the player cannot feel when just performing the fitness action.

(10)

One or more processors may determine whether or not the achievement condition has been satisfied, on the basis of a game result based on the action data and on a player parameter associated with the player and/or a player character corresponding to the player. The information processing program may further cause the one or more processors to progress the game according to achievement of the game event, and update the player parameter so that the achievement condition is more easily satisfied according to the progress of the game.

According to the configuration of above (10), the player parameter being updated allows the player to advantageously progress the game, thereby allowing the player to enjoy the sense of achievement on the game. Thus, the player can be motivated to continuously perform the fitness action while continuing to play the game.

(11)

The information processing program may further cause the one or more processors to execute causing a storage medium, which is accessible by the information processing apparatus, to store therein physical information before execution of the game event, the physical information having been set before execution of the game event. The game event may be executed by use of the physical information.

According to the configuration of above (11), since the game event is executed according to the physical information of each player, the player can easily perform a fitness action according to his/her physical ability and/or physical condition.

(12)

The physical information may include information that is determined on the basis of action data based on a fitness action having been performed by the player before execution of the game event.

According to the configuration of above (12), the game event can be executed by using the highly accurate physical information.

(13)

In the first fitness event, a load on the fitness action that the player is caused to perform during the game event may vary according to the physical information.

According to the configuration of above (13), the player can perform the fitness action with a load according to his/her physical ability and/or physical condition.

(14)

Executing the game event may further include calculating an evaluation result of the fitness action performed by the player during the first fitness event, based on the action data acquired during the first fitness event and on the physical information. Whether or not the achievement condition has been satisfied may be determined on the basis of the game result based on the evaluation result.

According to the configuration of above (14), evaluation of the fitness action can be performed with high accuracy by taking into account the physical information of the player.

(15)

In the first fitness event in which the player is caused to perform a fitness action of taking a predetermined target posture, when it is determined, based on the action data, that a state where the posture of the player has not reached the target posture has been continued for a predetermined time, a threshold value used for the determination may be updated so that it is more easily determined that the player has taken the target posture.

According to the configuration of above (15), the player can perform the fitness action without taking an unnatural posture.

(16)

Executing the game event may further include, before the first fitness event, determining, based on the action data, whether or not the posture of the player is the posture to be taken at the start of the fitness action corresponding to the first fitness event. The first fitness event may be started upon determination, based on the action data, that the player has taken the posture at the start of the fitness action.

According to the configuration of above (16), the likelihood that the fitness event is started in the state where the player is not ready for the fitness action, can be reduced. In addition, the player can easily perform the fitness action from the posture at the start in the fitness event.

(17)

During the first fitness event, an image of a body of the player or a player character corresponding to the player may be displayed on a display device, and a part of the image of the body is displayed in an emphasized manner, the part corresponding to the fitness action that is performed by the player during the first fitness event.

According to the configuration of above (17), the player is notified, in an easy-to-understand manner, about a part of the body on which the fitness action that the player is performing works, or about a part of the body to be used in the exercise of the fitness action.

(18)

Another example of a non-transitory computer-readable storage medium described herein has stored therein an information processing program executed by one or more processors of an information processing apparatus. The information processing program causes the one or more processors to execute: acquiring action data based on an output of a sensor according to a fitness action performed by a player; and progressing a game according to achievement of a battle event of fighting a battle with an enemy character. Progressing the game includes: during the battle event, executing a fitness event that causes the player to perform a fitness action; and decreasing a vitality value of the enemy character when the action data acquired during the fitness event satisfies a condition according to the fitness event. When the vitality value of the enemy character has satisfied a predetermined condition, the game is progressed upon determining that the battle event has been achieved.

According to the configuration of above (18), since the fitness action is used as an instruction to perform an attack in the battle event, the motivation on the game to "defeat the enemy character and progress the game" becomes the motivation for the player to perform the fitness action. Thus, the player can be motivated to perform the fitness action in the game.

(19)

The one or more processors may be configured to execute a plurality of types of fitness events that cause the player to perform different types of fitness actions. An amount of decrease in the vitality value of the enemy character may vary depending on the type of a fitness event that causes the player to perform a fitness action.

According to the configuration of above (19), the player is motivated to improve the quality of the fitness action that the player performs.

(20)

An amount of decrease in the vitality value of the enemy character may vary depending on evaluation regarding to the action data acquired during the battle event.

According to the configuration of above (20), the strategic characteristics of the game which causes the player to perform the fitness action, can be improved. In addition, the player is motivated to perform various types of fitness actions.

(21)

An amount of decrease in the vitality value of the enemy character may be larger in a case where a load is great than in a case where the load is small, wherein the load is on a fitness action corresponding to the fitness event and is set with respect to the fitness event, or is calculated based on a fitness action performed by the player during the fitness event.

According to the configuration of above (21), since the player can attain a good game result by steadily performing the fitness action, the player is motivated to improve the quality of the fitness action that the player performs.

(22)

Decreasing the vitality value of the enemy character may include updating the vitality value of the enemy character, based on the action data and on a player parameter associated with the player and/or a player character corresponding to the player. The information processing program may further cause the one or more processors to execute: updating the player parameter such that an amount of decrease in the vitality value of the enemy character increases as the game progresses in a case where the action data acquired during the battle event is the same.

According to the configuration of above (22), since the player parameter being updated allows the player to damage the enemy character more seriously, thereby allowing the player to enjoy the sense of achievement on the game. Thus, the player can be motivated to continuously perform the fitness action while continuing to play the game.

(23)

After a battle event in which a first enemy character appears has been achieved, a battle event in which a second enemy character having a vitality value larger than that of the first enemy character appears may be executed.

According to the configuration of above (23), the player is allowed to enjoy the sense of achievement on the game by progressing the game.

(24)

The one or more processors may be able to execute a plurality of types of fitness events that cause the player to perform different types of fitness actions. Progressing the game may further include designating at least one type of fitness action from among the plurality of types of fitness events during the battle event. The designated fitness event may be executed. The one or more processors may be able to execute designation of a fitness event a plurality of number of times. Regarding a fitness event that has been designated a predetermined number of times, designation of this fitness event may be restricted until a condition for making this fitness event able to be designated again is satisfied.

According to the configuration of above (24), the likelihood that the player gets tired through performing only a specific fitness action, can be reduced.

(25)

The one or more processors may be configured to execute a plurality of types of fitness events that cause the player to perform different types of fitness actions. The battle event may include an attack event of attacking the enemy character, and a defense event of defending against the attack from the enemy character. Progressing the game may further include, during the battle event, designating at least one type of fitness event from among the plurality of types of fitness events in response to a selection instruction performed by the player. The one or more processors may be configured to execute: decreasing the vitality value of the enemy character in a case where, in the attack event, the action data acquired during the designated fitness event satisfies the condition according to the fitness event; and decreasing a vitality value of a player character corresponding to the player in a case where, in the defense event, the action data acquired during a fitness event determined independently of an instruction of the player satisfies the condition according to the fitness event.

According to the configuration of above (25), the game, in which the player character defends against the attack from the enemy character, can be performed in a good tempo.

(26)

Progressing the game may further include ending the battle event upon determining that the player has been defeated in the battle event, in a case where the vitality value of the player character has satisfied a predetermined condition.

According to the configuration of above (26), the player is caused to perform the fitness action while allowing the player to enjoy the sense of tension that the player cannot feel when just performing the fitness action.

(27)

The information processing program may further cause the one or more processors to cause a storage medium, which is accessible by the information processing apparatus, to store therein physical information of the player before execution of the battle event. The physical information has been set before execution of the battle event. The one or more processors may decrease the vitality value of the enemy character, based on the action data acquired during the fitness event and on the physical information.

According to the configuration of above (27), the game result according to the fitness action performed by the player can be adjusted according to the physical information of the player.

(28)

In the fitness event in which the player is caused to perform a fitness action of taking a predetermined target posture, when the state where the action data acquired during the fitness event has not reached a value corresponding to the target posture has been continued for a predetermined time, a threshold value regarding the target posture may be updated so that the action data more easily reaches the value corresponding to the target posture.

According to the configuration of above (28), the player can perform the fitness action without taking an unnatural posture.

This specification discloses an information processing apparatus and an information processing system, each including the respective means described in above (1) to (28). Further, this specification discloses an information processing method to be executed in the information processing apparatus (or the information processing system) described in above (1) to (28).

According to the storage medium, the information processing system, the information processing apparatus, and the information processing method, it is possible to motivate a player to perform a fitness action.

These and other objects, features, aspects and advantages of the exemplary embodiment will become more apparent from the following detailed description when taken in conjunction with the accompanying drawings.

BRIEF DESCRIPTION OF THE DRAWINGS

FIG. 21 is a diagram showing an example of various data used for information processing in a non-limiting game system 1;

DETAILED DESCRIPTION OF NON-LIMITING EXAMPLE EMBODIMENTS

1. Configuration of Game System

Figure 1:
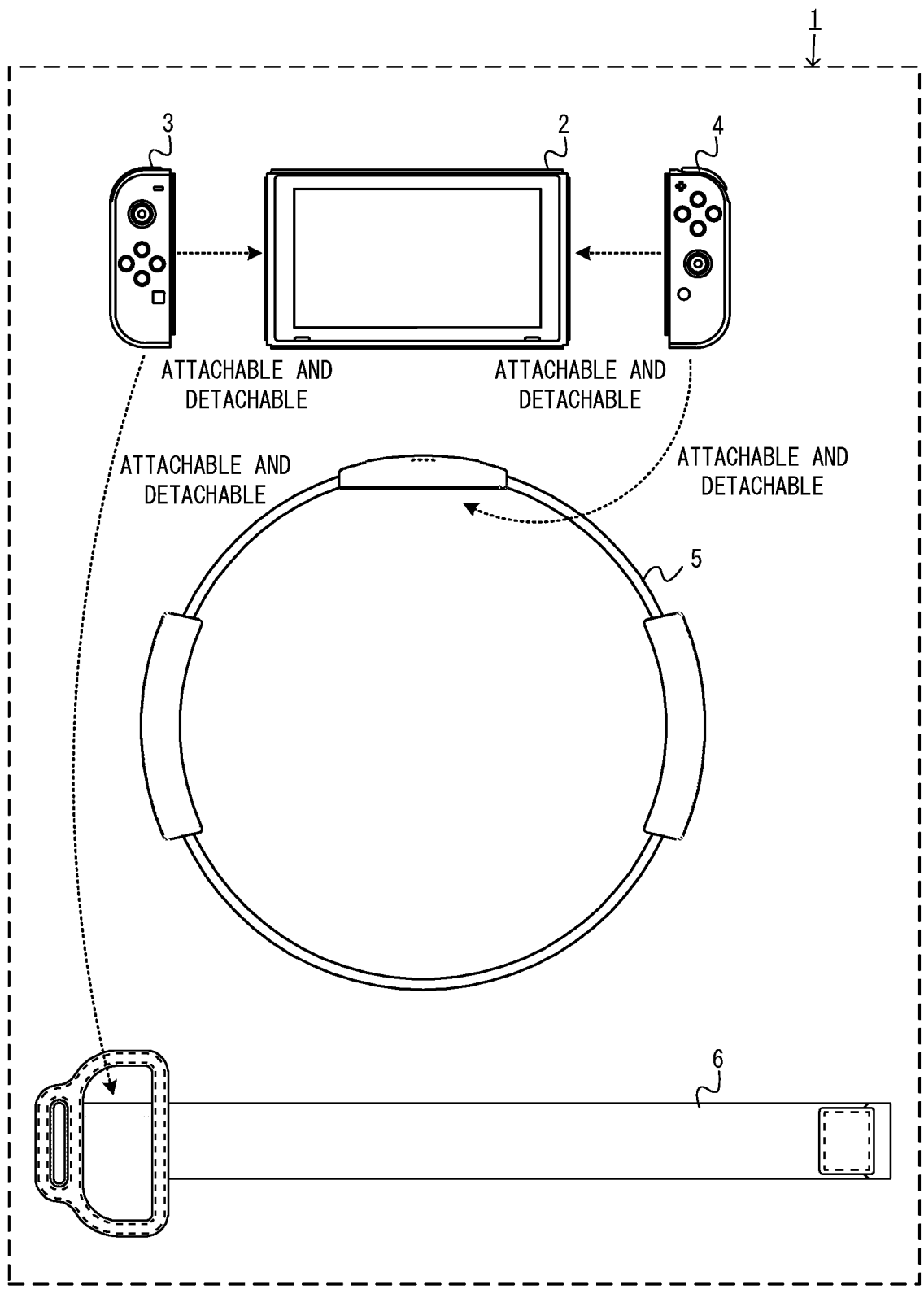
FIG. 1 is a diagram showing an example of a non-limiting apparatuses included in a game system.

A game system according to an example of the present embodiment will now be described. FIG. 1 is a diagram showing an example of apparatuses included in the game system. As shown in FIG. 1, a game system 1 includes a main body or game-playing apparatus 2, a left controller 3, a right controller 4, a ring-shaped extension apparatus 5, and a belt-shaped extension apparatus 6.

The main body apparatus 2 is an example of an information processing apparatus, and functions as a game device main body in the present embodiment. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus".

The ring-shaped extension apparatus 5 is an example of an extension apparatus that is used with the right controller 4. The ring-shaped extension apparatus 5 is used with the right controller 4 attached thereto. The belt-shaped extension apparatus 6 is an example of an extension apparatus that is used with the left controller 3. The belt-shaped extension apparatus 6 is used with the left controller 3 attached thereto. Thus, in the present embodiment, the user can use the controllers 3 and 4 while they are attached to the respective extension apparatuses (see FIG. 15). Note that the ring-shaped extension apparatus 5 is not limited for use with the right controller 4, but the left controller 3 may be attachable thereto. The belt-shaped extension apparatus 6 is not limited for use with the left controller 3, but the right controller 4 may be attachable thereto.

Figure 2:
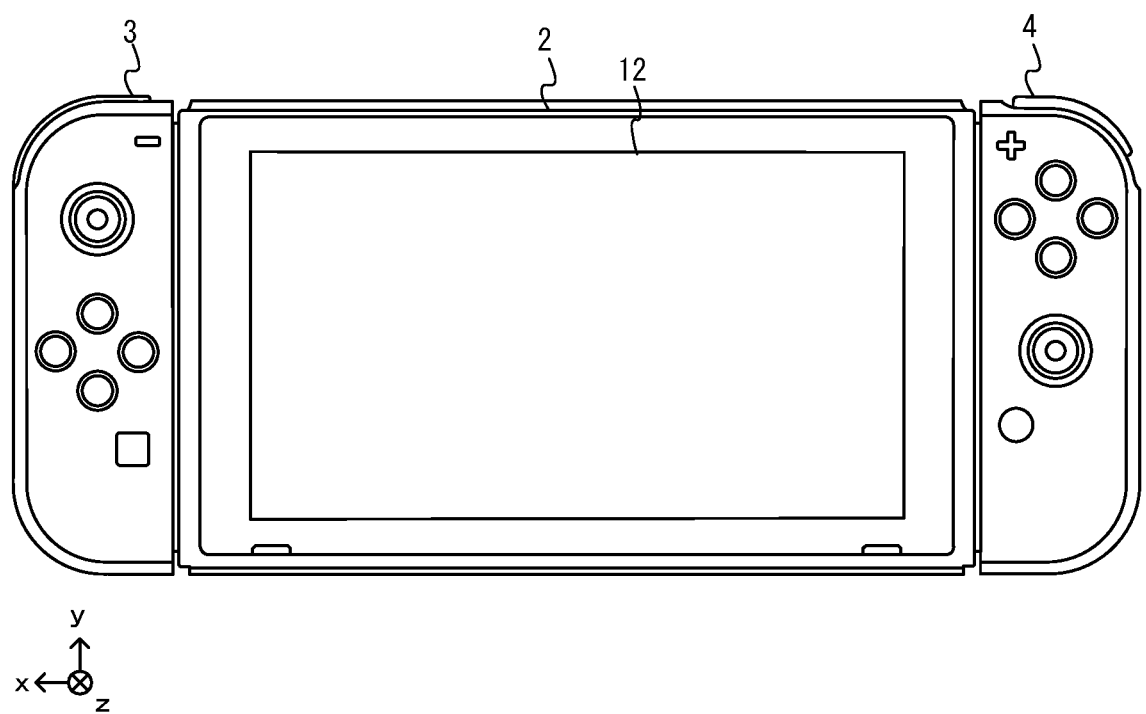
FIG. 2 is a diagram showing an example of a state where a non-limiting left controller and a non-limiting right controller are attached to a non-limiting main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
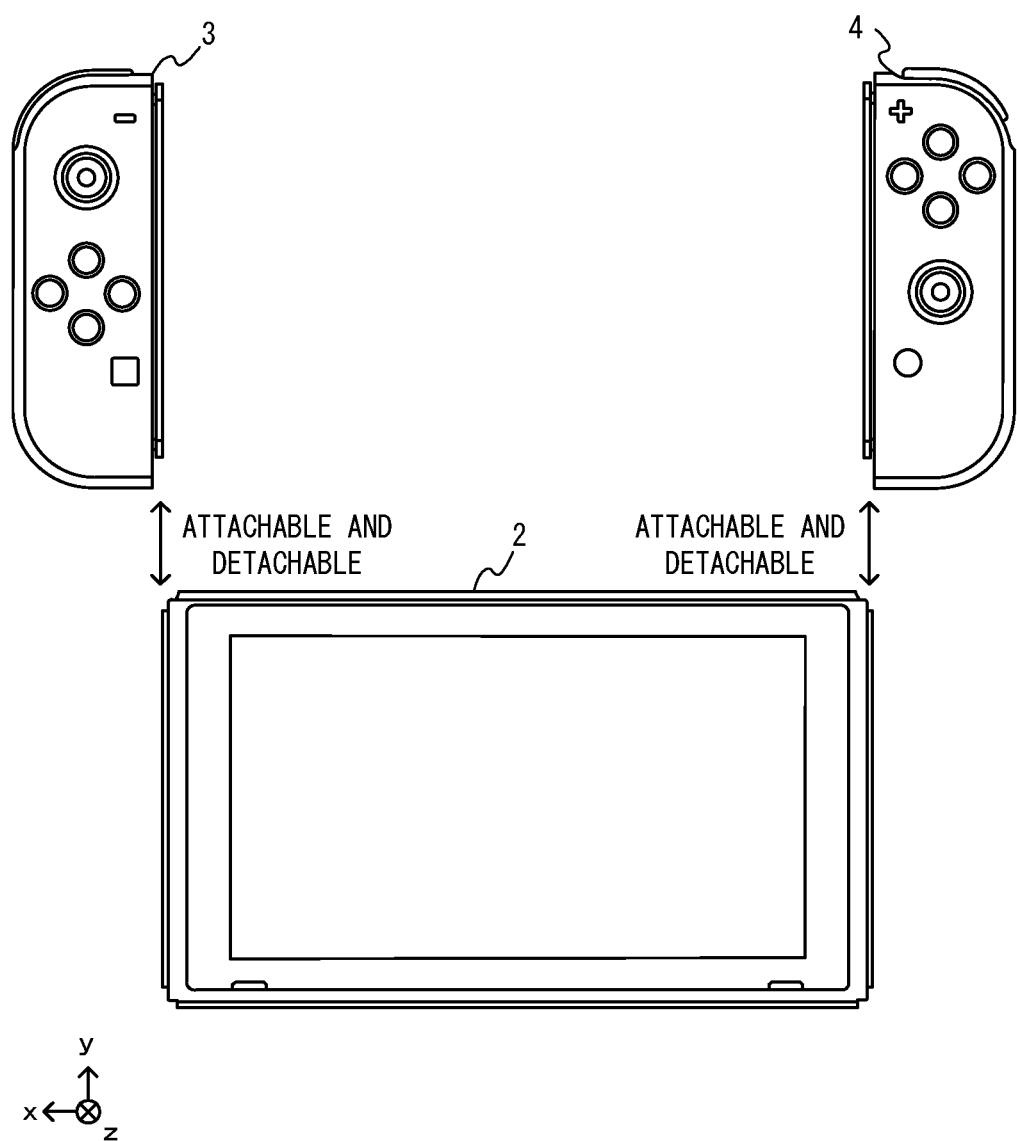
FIG. 3 is a diagram showing a state where a non-limiting left controller and a non-limiting right controller are detached from a non-limiting main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
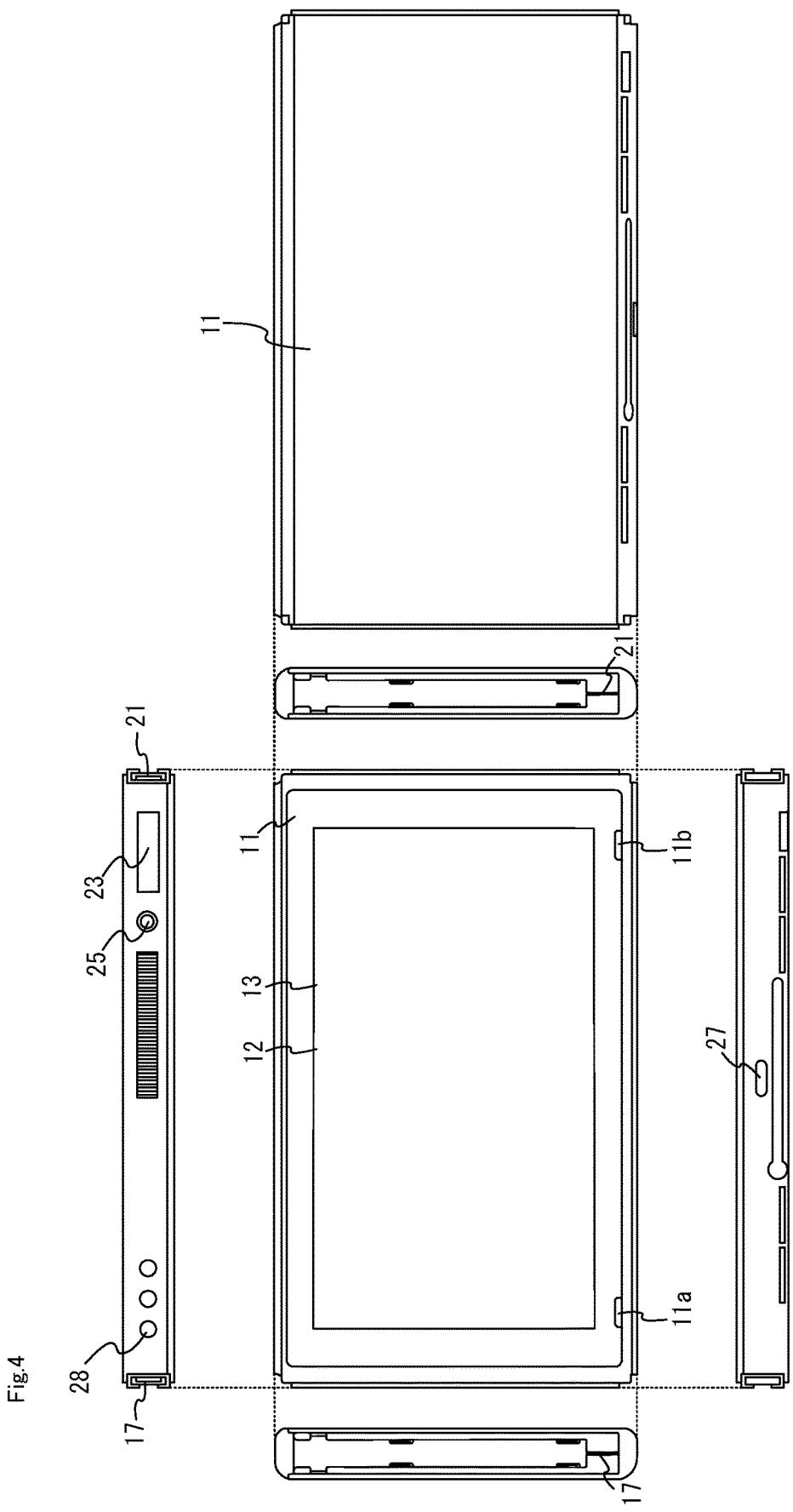
FIG. 4 is six orthogonal views showing an example of a non-limiting main body apparatus.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 7) within the housing 11. As shown in FIG. 4, speaker holes 11a and 11b are formed on the main surface of the housing 11. Then, sounds output from the speakers 88 are output through the speaker holes 11a and 11b.

The main body apparatus 2 includes a left-side terminal 17 that enables wired communication between the main body apparatus 2 and the left controller 3, and a right-side terminal 21 that enables wired communication between the main body apparatus 2 and the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 5:
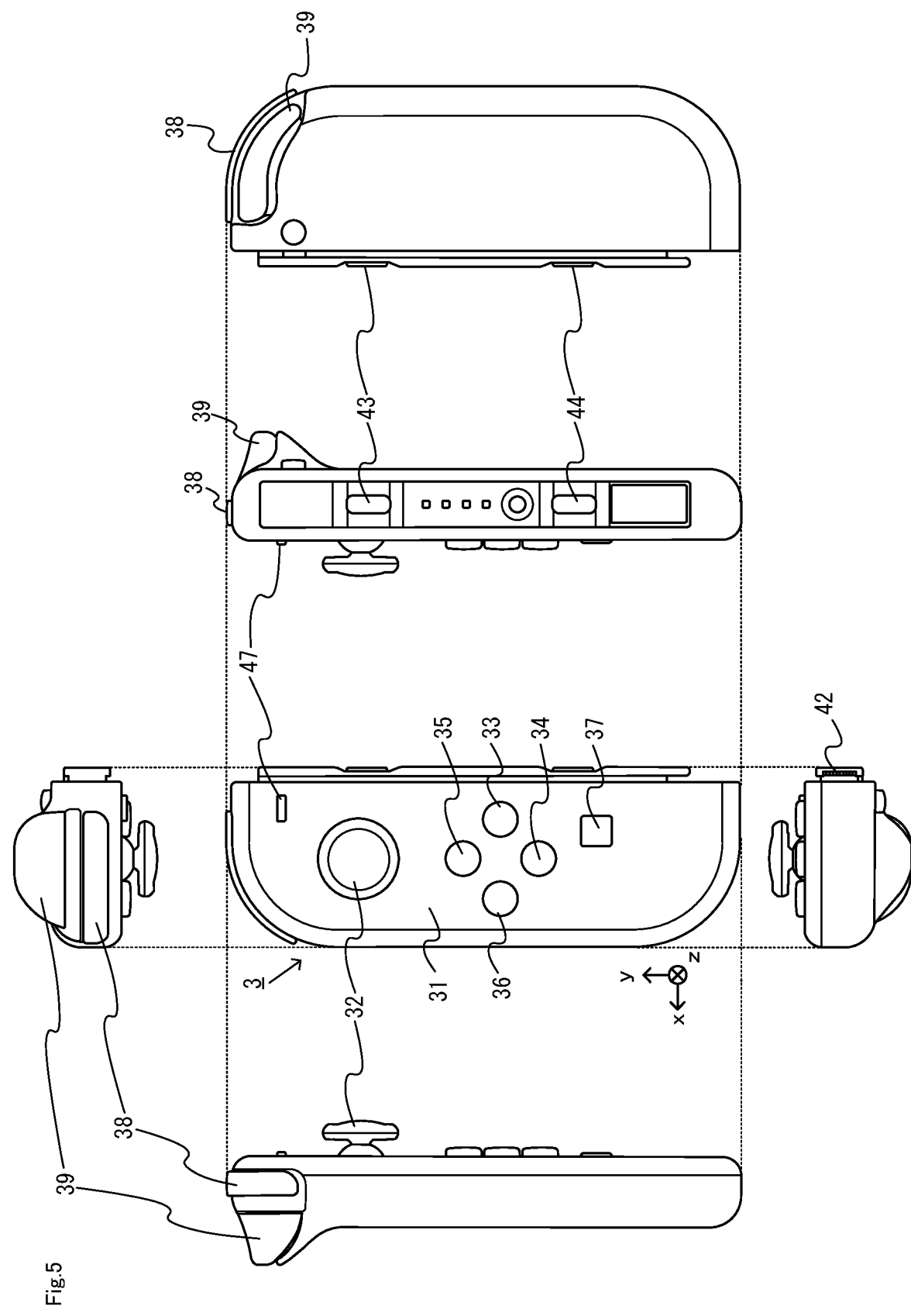
FIG. 5 is six orthogonal views showing an example of a non-limiting left controller.

FIG. 5 is six orthogonal views showing an example of the left controller 3. As shown in FIG. 5, the left controller 3 includes a housing 31. In the exemplary embodiment, the housing 31 has a vertically long shape, e.g., is shaped to be long in an up-down direction (i.e., a y-axis direction shown in FIGS. 2 and 5). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 5, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

The left controller 3 includes a terminal 42 that enables wired communication between the left controller 3 and the main body apparatus 2.

Figure 6:
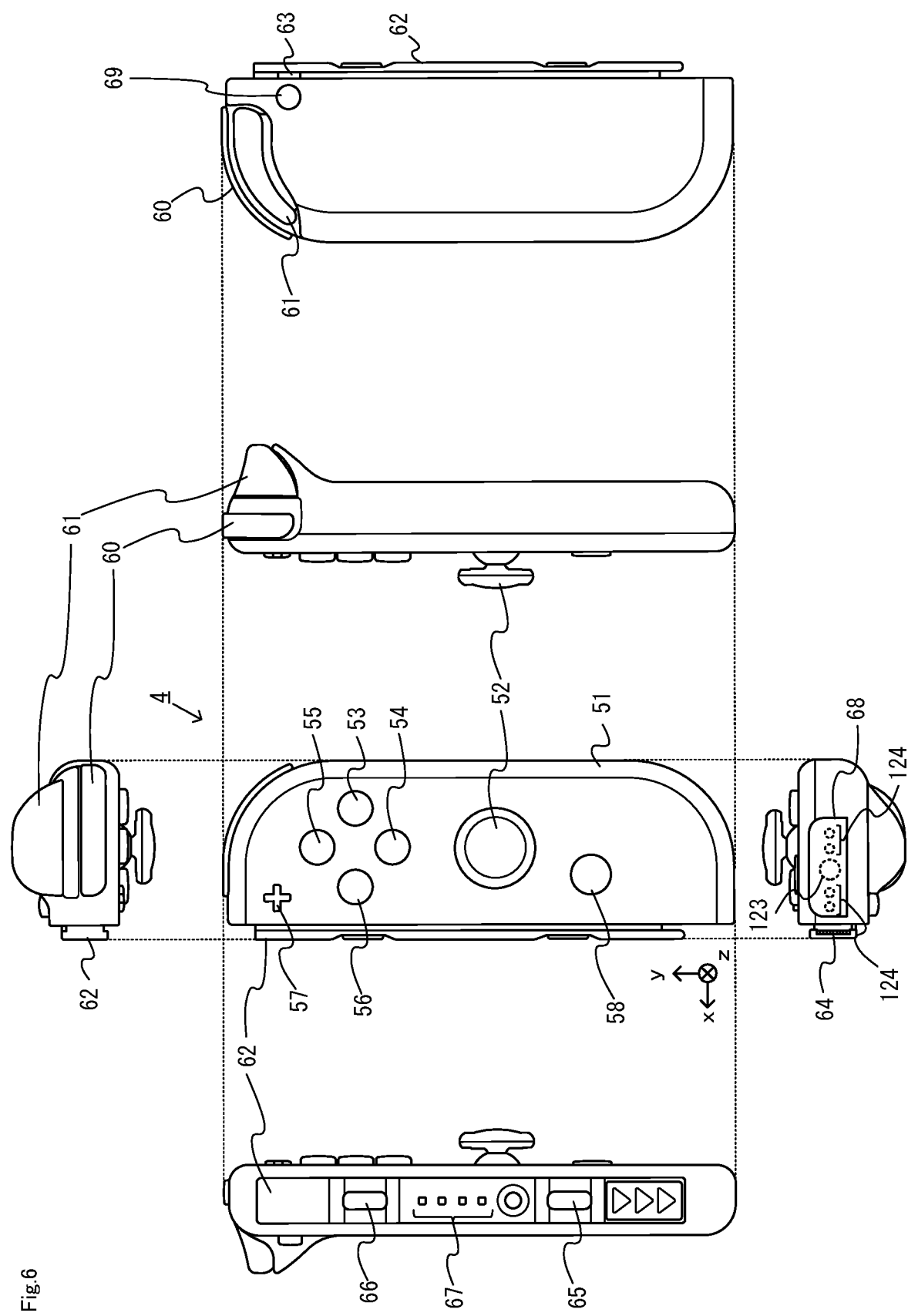
FIG. 6 is six orthogonal views showing an example of a non-limiting right controller.

FIG. 6 is six orthogonal views showing an example of the right controller 4. As shown in FIG. 6, the right controller 4 includes a housing 51. In the exemplary embodiment, the housing 51 has a vertically long shape, e.g., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 6) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 6) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, the right controller 4 includes a terminal 64 for the right controller 4 to perform wired communication with the main body apparatus 2.

Figure 7:
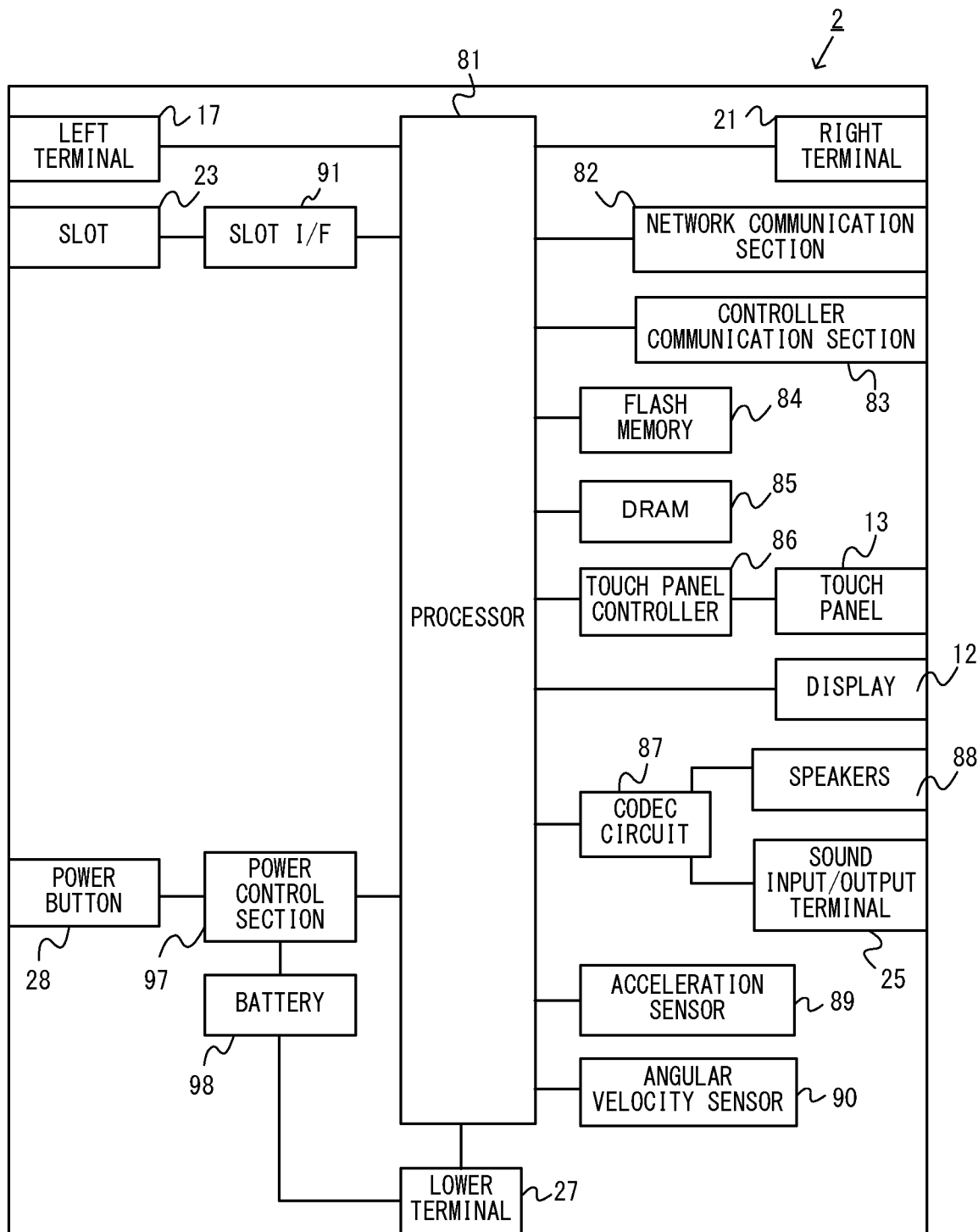
FIG. 7 is a block diagram showing an example of an internal configuration of a non-limiting main body apparatus.

FIG. 7 is a block diagram showing an example of the internal configuration of the main body apparatus 2. The main body apparatus 2 includes components 81 to 91, 97, and 98 shown in FIG. 7 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 2) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 2). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 8:
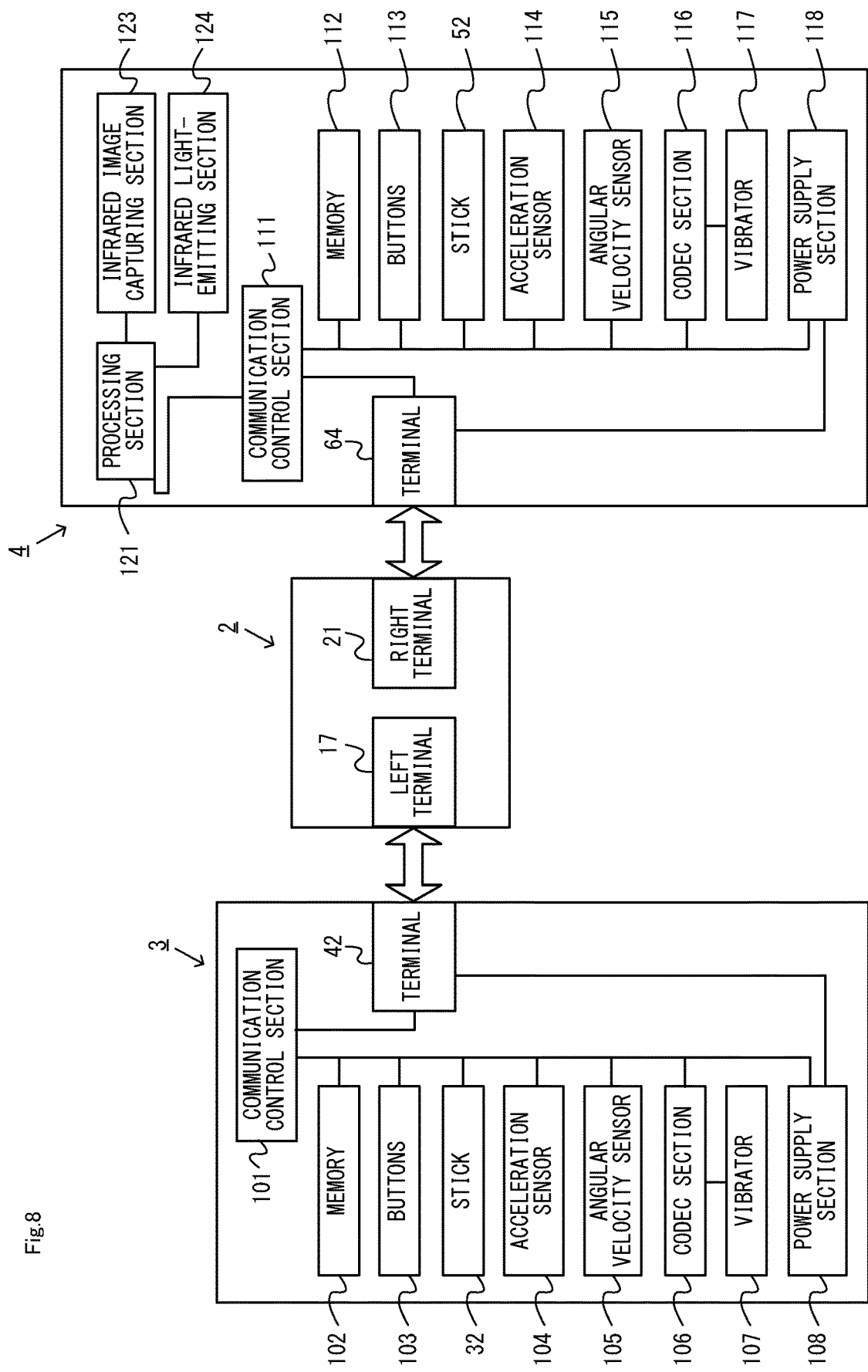
FIG. 8 is a block diagram showing an example of an internal configuration of a non-limiting main body apparatus, a non-limiting left controller and a non-limiting right controller.

FIG. 8 is a block diagram showing examples of the internal configurations of the main body apparatus 2, the left controller 3, and the right controller 4. It should be noted that the details of the internal configuration of the main body apparatus 2 are shown in FIG. 7 and therefore are omitted in FIG. 8.

The left controller 3 includes a communication control section 101, which communicates with the main body apparatus 2. As shown in FIG. 8, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 8) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 5) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 5). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 8, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the infrared image capturing section 123 and the infrared light-emitting section 124.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

Figure 9:
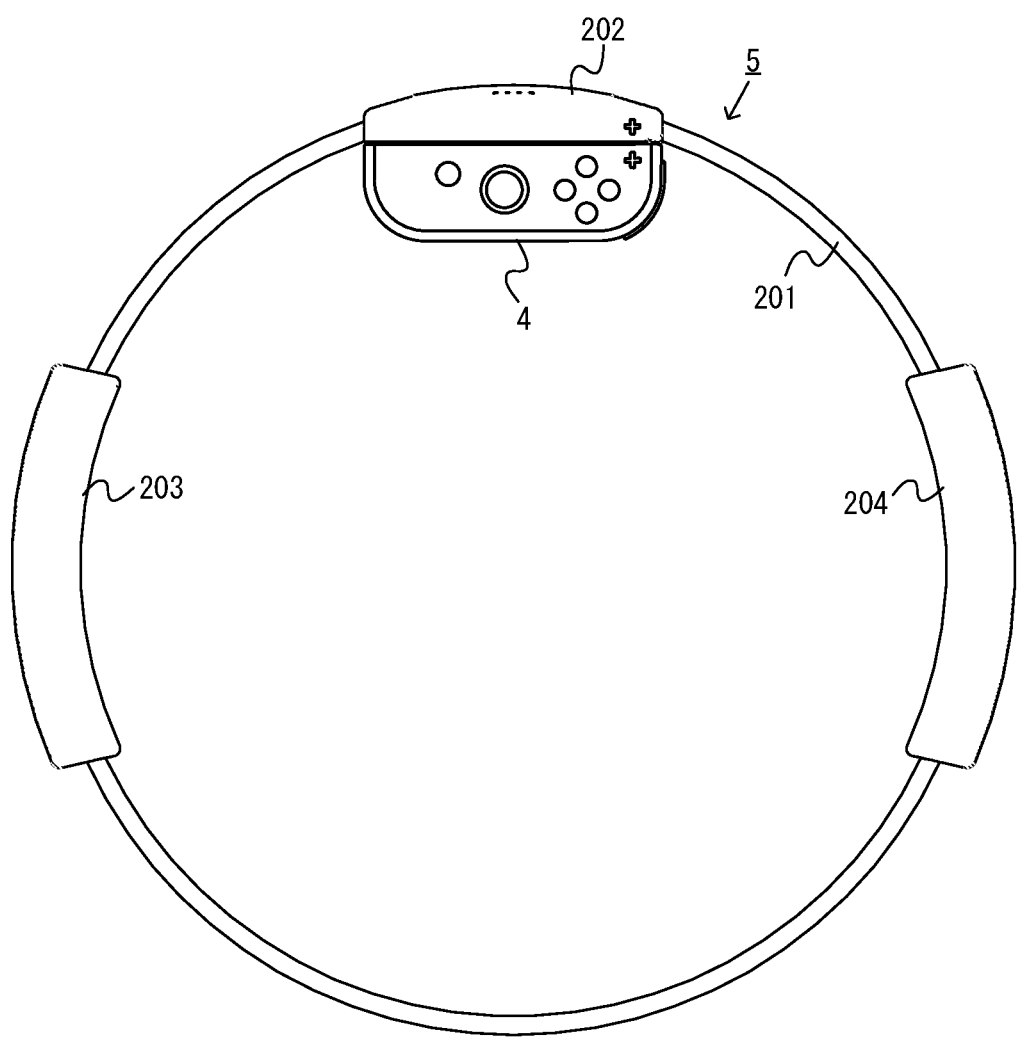
FIG. 9 is a diagram showing an example of a non-limiting ring-shaped extension apparatus 5.

FIG. 9 is a diagram showing an example of a ring-shaped extension apparatus. Note that FIG. 9 shows the ring-shaped extension apparatus 5 with the right controller 4 attached thereto. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 9, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 of the right controller 4 (see FIG. 6). As the slider 62 is inserted into the rail member in a predetermined straight direction (i.e., the slide direction), the rail member engages with the slider 62 so that the slider 62 is slidable against the rail member in the straight direction. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the right controller 4 includes a latch portion 63 (see FIG. 6). The latch portion 63 is provided so as to protrude sideways (i.e., the z-axis positive direction shown in FIG. 6) from the slider 62. While the latch portion 63 is allowed to move into the slider 62, the latch portion 63 is urged (e.g., by means of a spring) into the position described above in which the latch portion 63 is protruding sideways. The rail portion 211 is provided with a notch 219. The latch portion 63 engages with the notch 219 in a state where the slider 62 is inserted to the far end of the rail portion. As the latch portion 63 engages with the notch 219 while the rail portion is in engagement with the slider 62, the right controller 4 is attached to the main portion 202.

Note that the right controller 4 includes the release button 69 that can be pressed (see FIG. 6). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 9, the ring-shaped extension apparatus 5 includes grip covers 203 and 204. The grip covers 203 and 204 are components to be held by the user. In the present embodiment, the grip covers 203 and 204 can be removed from the ring-shaped portion 201. In the present embodiment, a left grip cover 203 is provided on a left grip portion near the left end of the ring-shaped portion 201, and a right grip cover 204 is provided on a right grip portion near the right end of the ring-shaped portion 201. The number of the grip portions is optional. Depending on a supposed operation method, grip portions may be provided at three or more positions, or a grip portion may be provided at only one position. Depending on the content of the game (or the content of a fitness action that the user performs in the game), only a specific grip portion among a plurality of grip portions may be held by one hand or both hands.

Figure 10:
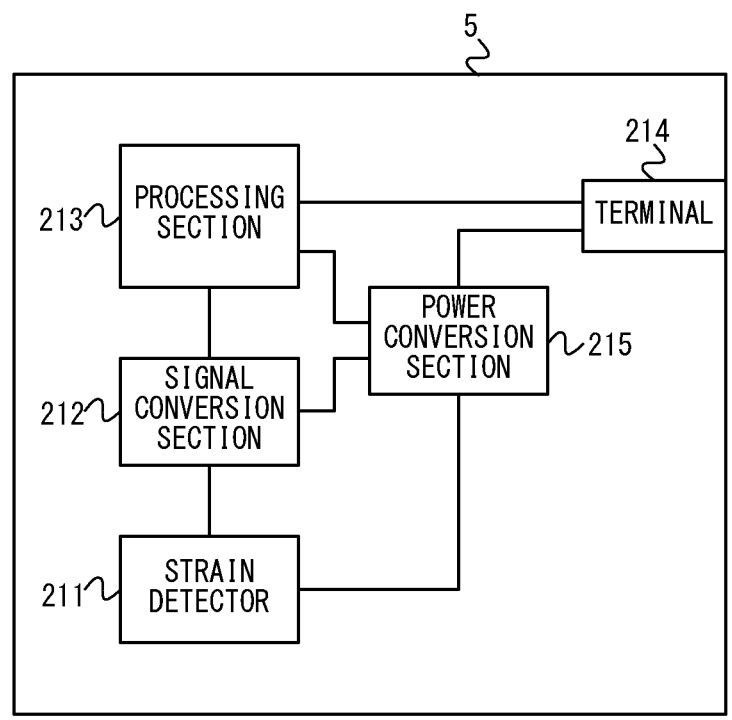
FIG. 10 is a block diagram showing an example of an internal configuration of the non-limiting ring-shaped extension apparatus 5.

FIG. 10 is a block diagram showing an electrical connection relationship between components of the ring-shaped extension apparatus 5. As shown in FIG. 10, the ring-shaped extension apparatus 5 includes a strain detector 211. The strain detector 211 is an example of a detector that detects deformation of the ring-shaped portion 201. In the present embodiment, the strain detector 291 includes a strain gauge. The strain detector 211 outputs a signal representing the strain of the base portion 242 in accordance with the deformation of the elastic member described below (in other words, a signal representing the magnitude of deformation and the direction of deformation of the elastic member).

Herein, in the present embodiment, the ring-shaped portion 201 includes an elastically-deformable elastic portion and a base portion. The base portion holds the opposite end portions of the elastic member so that the base portion and the elastic member together form a ring shape. Note that the base portion is not shown in FIG. 9 since the base portion is provided inside the main portion 202. The base portion is made of a material having a higher rigidity than the elastic member. For example, the elastic member is made of a resin (e.g., an FRP (Fiber Reinforced Plastics)), and the base portion is made of a metal. The strain gauge is provided on the base portion and detects the strain of the base portion. When the ring-shaped portion 201 deforms from the normal state, a strain occurs on the base portion due to the deformation, and the strain on the base portion is detected by the strain gauge. Based on the detected strain, it is possible to calculate the direction in which the ring-shaped portion 201 deforms (i.e., whether it is the direction in which the two grip covers 203 and 204 move closer to each other or the direction in which they move away from each other) and calculate the amount of deformation.

Note that in other embodiments, the strain detector 211 may include, instead of the strain gauge, any sensor that is capable of detecting the deformation of the ring-shaped portion 201 from the normal state. For example, the detector 211 may include a pressure sensor for detecting the pressure that is applied when the ring-shaped portion 201 is deformed, or may include a bend sensor for detecting the amount by which the ring-shaped portion 201 is bent.

The ring-shaped extension apparatus 5 includes a signal conversion section 212. In the present embodiment, the signal conversion section 212 includes an amplifier and an AD converter. The signal conversion section 212 is electrically connected to the strain detector 211 so as to amplify the output signal from the strain detector 211 through the amplifier and performs an AD conversion through the AD converter. The signal conversion section 212 outputs a digital signal representing the strain value detected by the strain detector 211. Note that in other embodiments, the signal conversion section 212 may not include an AD converter, and a processing section 213 to be described below may include an AD converter.

The ring-shaped extension apparatus 5 includes the processing section 213. The processing section 213 is a processing circuit including a processor and a memory, and is an MCU (Micro Controller Unit), for example. The processing section 213 is electrically connected to the signal conversion section 212, and the output signal from the signal conversion section 212 is input to the processing section 213. The ring-shaped extension apparatus 5 includes the terminal 214. The terminal 214 is electrically connected to the processing section 213. When the right controller 4 is attached to the ring-shaped extension apparatus 5, the processing section 213 sends information representing the strain value that is represented by the output signal from the signal conversion section 212 (in other words, the ring operation data) to the right controller 4 through the terminal 214.

The ring-shaped extension apparatus 5 includes a power conversion section 215. The power conversion section 215 is electrically connected to the sections 211 to 214. The power conversion section 215 supplies power, which is supplied from the outside (i.e., the right controller 4) through the terminal 214, to the sections 211 to 214. The power conversion section 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the processing section 213 may perform a process of calculating the amount of deformation of the elastic member based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 11:
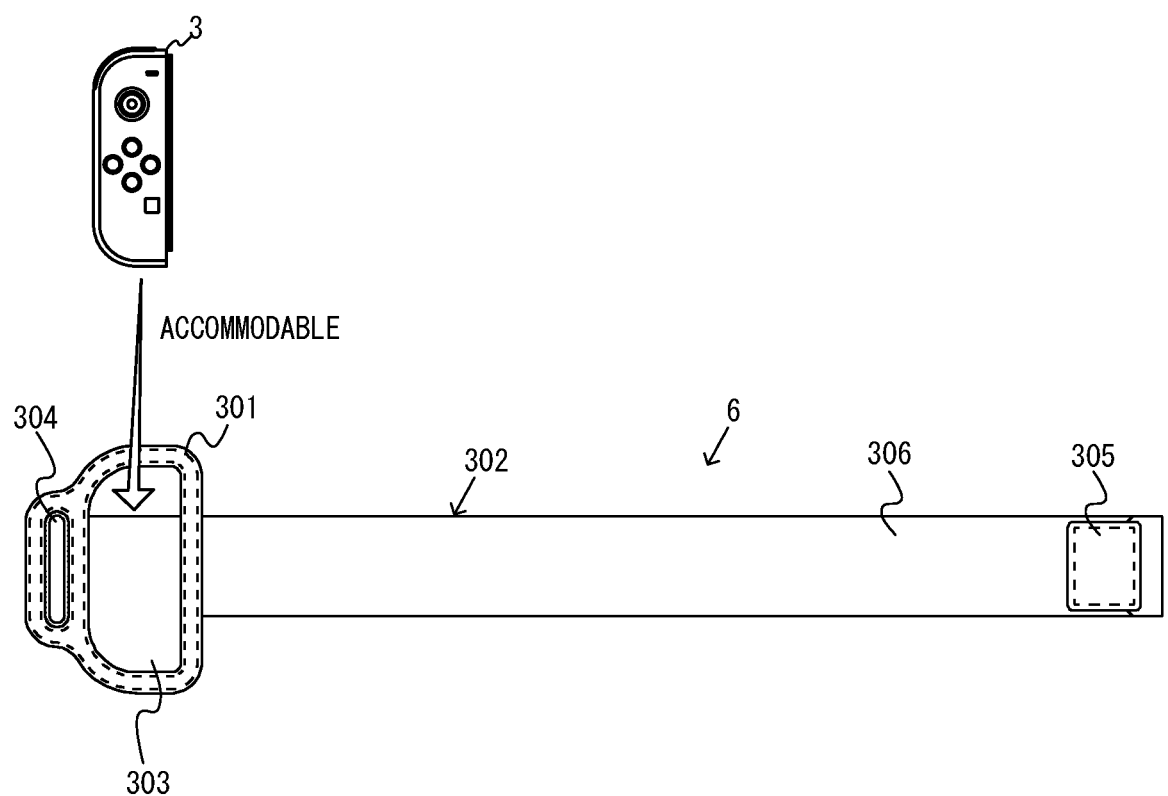
FIG. 11 is a diagram showing an example of a non-limiting belt-shaped extension apparatus 6.

FIG. 11 is a diagram showing an example of a belt-shaped extension apparatus. The belt-shaped extension apparatus 6 is fastened to a leg of the user with the left controller 3 attached to the belt-shaped extension apparatus 6 (see FIG. 12). In the present embodiment, the belt-shaped extension apparatus 6 is made of a fabric and has a flat shape. As shown in FIG. 11, the belt-shaped extension apparatus 6 includes an accommodating portion 301 and a belt portion 302. The accommodating portion 301 has a flat shape and is capable of accommodating the left controller 3 therein. Specifically, the accommodating portion 301 includes a pocket portion 303. The pocket portion 303 is formed in a bag shape that is sized so that the left controller 3 can be accommodated therein. In the present embodiment, as the left controller 3 is accommodated in the accommodating portion 301, the left controller 3 is attached to the belt-shaped extension apparatus 6. Note that in other embodiments, there is no limitation on the configuration for attaching the left controller 3 to the belt-shaped extension apparatus 6.

The accommodating portion 301 includes a through hole 304 on one side of the pocket portion 303. The belt portion 302 is provided on one side of the pocket portion 303 of the accommodating portion 301, i.e., on the opposite side from the through hole 304 with respect to the pocket portion 303. The belt portion 302 has a band shape, and one end thereof is secured to the accommodating portion 301. In the present embodiment, the belt portion 302 is made of a flexible material (e.g., a woven rubber).

A first touch fastener 305 and a second touch fastener 306 are provided on the surface of the belt portion 302 on the same side as the pocket portion 303 is provided on the accommodating portion 301. The first touch fastener 305 is provided near the end portion of the belt portion 302 that is on the opposite side from the other end portion that is secured to the accommodating portion 301. The second touch fastener 306 is provided on the same surface as the first touch fastener 305 and on the side that is closer to the accommodating portion 301 than the first touch fastener 305. The first touch fastener 305 and the second touch fastener 306 can be attached to and detached from each other. For example, the first touch fastener 305 may be a hook-surface touch fastener, and the second touch fastener 306 is a loop-surface touch fastener.

When fastening the belt-shaped extension apparatus 6, the user passes the belt portion 302 through the through hole 304 with the belt portion 302 wound around a leg, and the user fastens together the first touch fastener 305 and the second touch fastener 306. Thus, the user can fasten the belt-shaped extension apparatus 6, with the left controller 3 attached thereto, to a leg (see FIG. 12).

Figure 12:
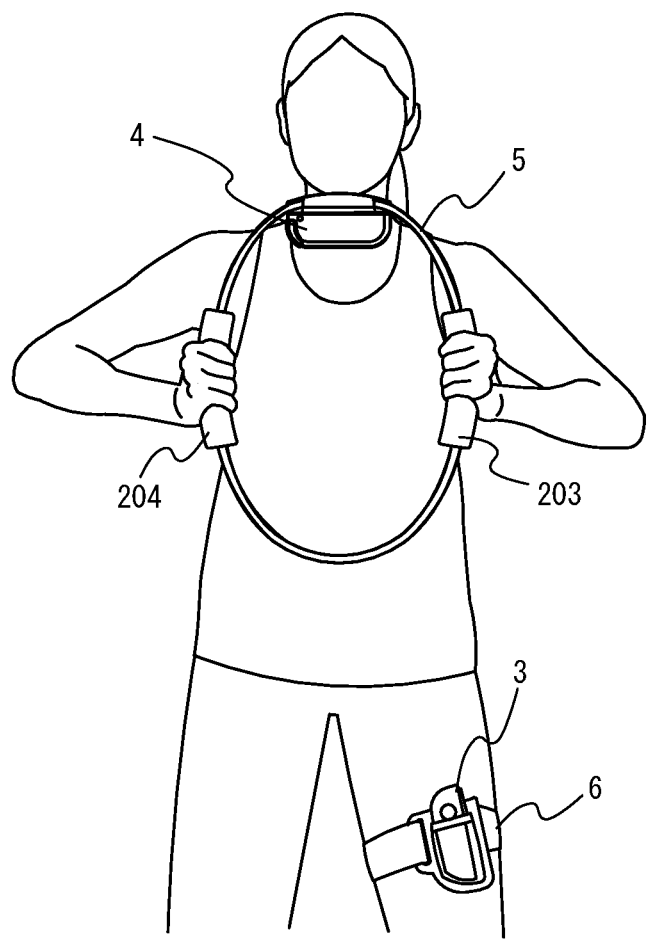
FIG. 12 is a diagram showing an example of a state where a user uses the non-limiting ring-shaped extension apparatus 5 and the non-limiting belt-shaped extension apparatus 6.

FIG. 12 shows an example of a state where the user uses the ring-shaped extension apparatus 5 and the belt-shaped extension apparatus 6. As shown in FIG. 12, the user can perform the game by using the two extension apparatuses 5 and 6 in addition to the game apparatus (i.e., the main body apparatus 2 and the controllers 3 and 4). For example, the user can use the ring-shaped extension apparatus 5 and the belt-shaped extension apparatus 6 as a set.

For example, as shown in FIG. 12, the user holds the ring-shaped extension apparatus 5 with the right controller 4 attached thereto with both hands, and fastens the belt-shaped extension apparatus 6 with the left controller 3 attached thereto to a leg. The user can play a game by performing an operation using the ring-shaped extension apparatus 5 (e.g., an operation of bending the ring-shaped extension apparatus 5 and an operation of moving the ring-shaped extension apparatus 5), and performing an operation of moving the leg to which the belt-shaped extension apparatus 6 is fastened.

Note that FIG. 10 shows an example of how the user holds the grip covers 203 and 204 and deforms the ring-shaped extension apparatus 5 by bending the ring-shaped extension apparatus 5. Through this action, the user can perform, as a game operation, a fitness exercise operation of training the arms. Note that the user can perform a game operation through any of various operations performed using the ring-shaped extension apparatus 5. For example, the user can perform an operation of deforming the ring-shaped extension apparatus 5 with one of the grip covers held by both hands and the other grip cover pressed against the belly. Through this action, the user can perform, as a game operation, a fitness exercise operation of training the arms and the abdominal muscles. The user can perform the operation of deforming the ring-shaped extension apparatus 5 while holding the ring-shaped extension apparatus 5 between the legs with the grip covers 203 and 204 pressed against the inner thighs of the legs. Through this action, the user can perform, as a game operation, a fitness exercise operation of training the leg muscles.

Where the game process is executed on the main body apparatus 2, the right controller 4 receives the ring operation data from the ring-shaped extension apparatus 5. The ring operation data includes information that represents the strain value. Specifically, the processing section 213 of the ring-shaped extension apparatus 5 transmits the ring operation data to the right controller 4 through the terminal 214. For example, the processing section 213 repeatedly transmits the ring operation data at the rate of once per a predetermined amount of time.

In such a case, the communication control section 111 of the right controller 4 transmits the ring operation data, which has been received from the ring-shaped extension apparatus 5 through the terminal 64, to the main body apparatus 2. The communication control section 111 transmits, to the main body apparatus 2, the right controller operation data including information obtained from the input sections included in the right controller 4 (specifically, the buttons 113, the analog stick 52 and the sensors 114 and 115). Note that, in the case where the right controller 4 is attached to the ring-shaped extension apparatus 5, the communication from the right controller 4 to the main body apparatus 2 is done by wireless communication. The communication control section 111 may transmit the right controller operation data and the ring operation data together with each other to the main body apparatus 2, or may transmit the data separately to the main body apparatus 2. The communication control section 111 may transmit the received ring operation data to the main body apparatus 2 as it is, or may perform some processes (e.g., data format conversion and/or an arithmetic process on the strain value, etc.) on the received ring operation data and transmit the processed data to the main body apparatus 2.

On the other hand, where the game process is executed on the main body apparatus 2, the communication control section 101 of the left controller 3 transmits the left controller operation data including information obtained from the input sections included in the left controller 3 (specifically, the buttons 103, the analog stick 32 and the sensors 104 and 105) to the main body apparatus 2. In the state where the left controller 3 is attached to the belt-shaped extension apparatus 6, communication from the left controller 3 to the main body apparatus 2 is wirelessly performed.

2. Information Processing in Game

Next, information processing in a game executed in the game system 1 will be described. In the game of the present embodiment, a player (in other words, a user) can make an instruction in the game by performing a fitness action. The fitness action is any exercise that will lead to maintaining and enhancing health and physical strength. Examples of the fitness action include: exercises for training muscle strength, such as squats, high-knees, push-ups, sit-ups, and an action of deforming the ring-shaped extension apparatus 5; exercises for burning fat; and exercises for enhancing body flexibility, such as stretching and yoga. In the present embodiment, when a player character operated by the player fights a battle with an enemy character in the game, the player can cause the player character to perform an attack and a defense through the fitness action. Hereinafter, a description will be given of a game flow in a battle event, as an example of a game event, in which a player character fights a battle with an enemy character. The "game event" is any event that occurs during the game. In the game event, for example, a game image showing how the game is progressed is displayed according to a game operation performed by the player.

2-1. Game Flow in Battle Event

Figure 13:
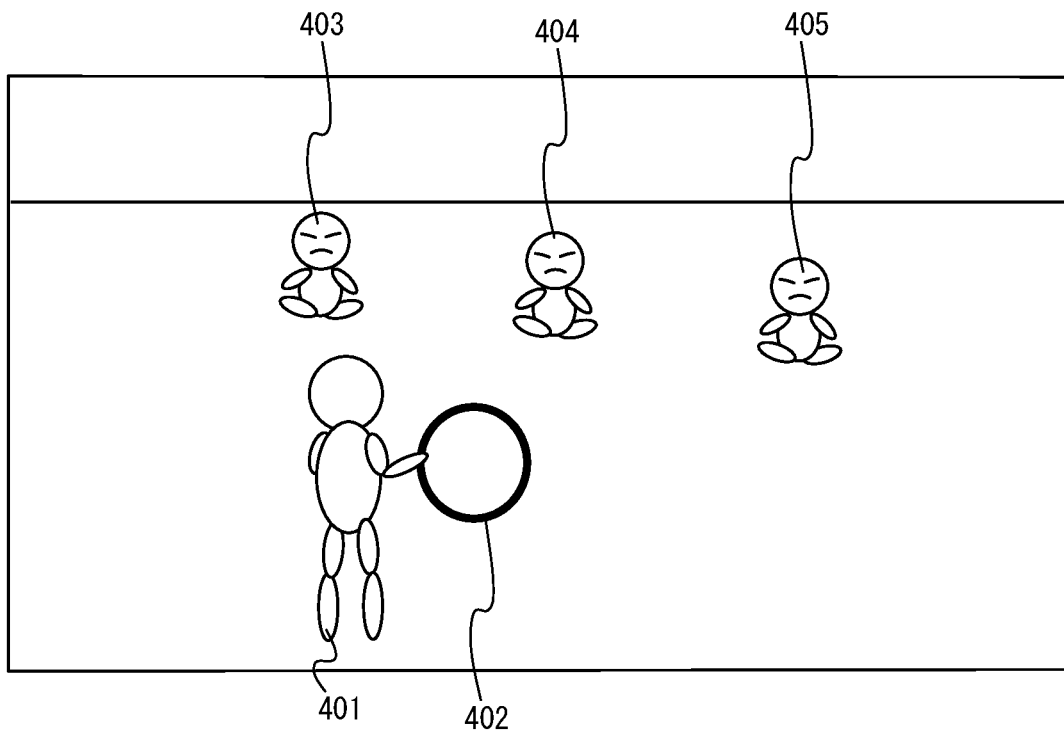
FIG. 13 is a diagram showing an example of a game image in a battle event.

FIG. 13 shows an example of the game image in the battle event. An achievement condition for the battle event is to win the battle event (i.e., to defeat all enemy characters). When the battle event has been started, the game system 1 displays the game image shown in FIG. 13 on a display device. The display device on which the game image is displayed may be the display 12 or the stationary monitor described above.

The game image shown in FIG. 13 includes a player character 401 and enemy characters 403 to 405. In the present embodiment, the player character 401 has a ring object 402 simulating the ring-shaped extension apparatus 5. Although three enemy characters 403 to 405 appear in FIG. 13, the number of enemy characters that appear in the battle event is optional.

Figure 14:
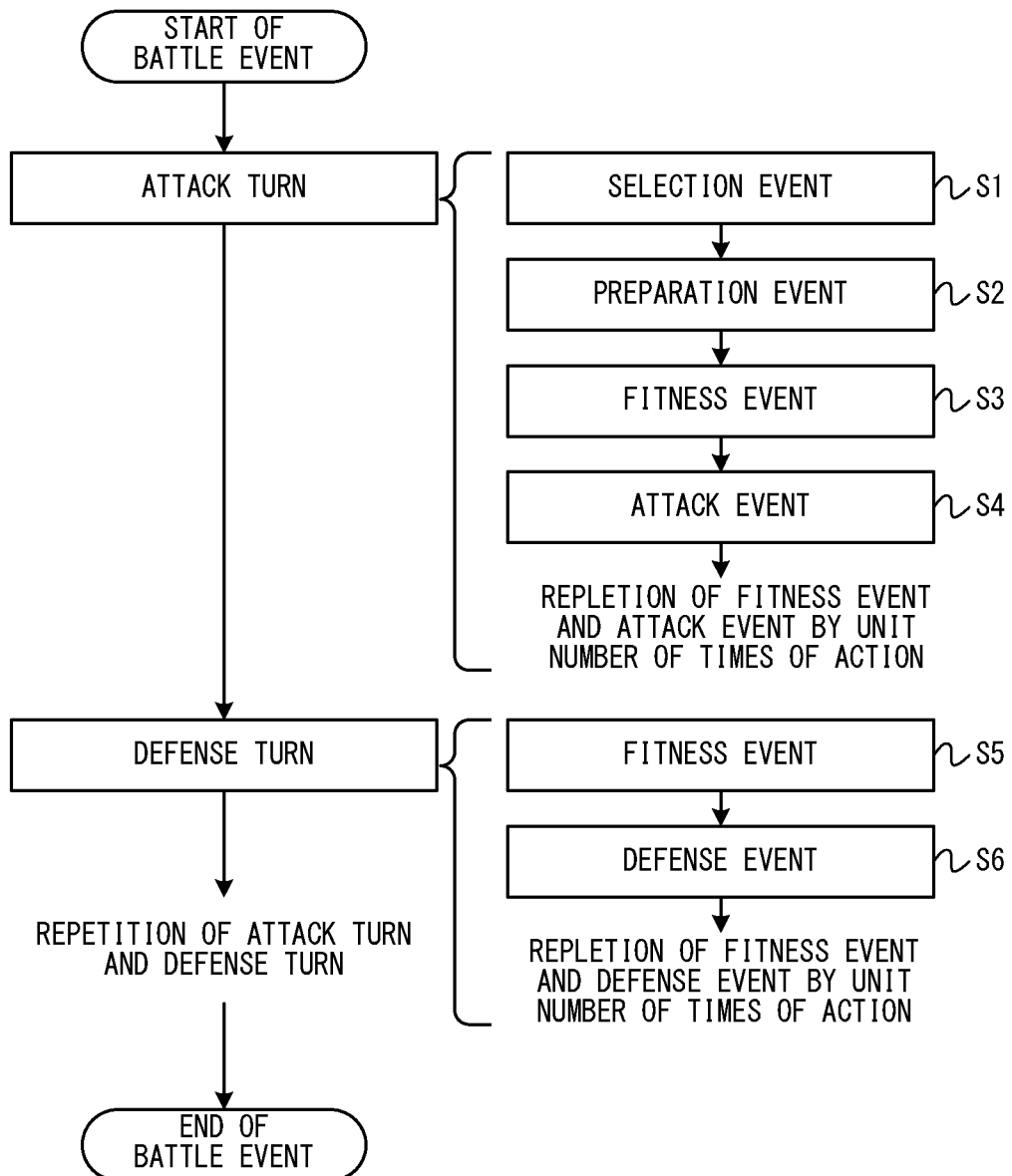
FIG. 14 is a diagram showing an example of a game flow in the battle event.

FIG. 14 shows an example of the game flow in the battle event. As shown in FIG. 14, in the present embodiment, a turn-based battle is progressed in the battle event. That is, the battle is progressed while an attack turn in which the player character 401 attacks an enemy character and a defense turn in which the player character 401 defends against an attack from an enemy character are alternately performed. In the present embodiment, when the battle event has been started, an attack turn is performed (after the game image shown in FIG. 13 has been displayed), but a defense turn may be performed first. The method of progressing the battle event is not limited to the turn-based method, and any method may be adopted. For example, in another embodiment, a waiting time may be set for each character (i.e., each of the player character 401 and the enemy characters), and the character may be allowed to perform an attack when the waiting time has passed.

First, the game flow in an attack turn of the player character 401 will be described. When the attack turn has been started, first, a selection event is executed in which the player selects a fitness action that the player should perform in the attack turn (step S1 shown in FIG. 14). In the selection event, the game system 1 displays a selection image on the display device. The selection image is a UI (user interface) image that allows the player to select a fitness action.

Figure 15:
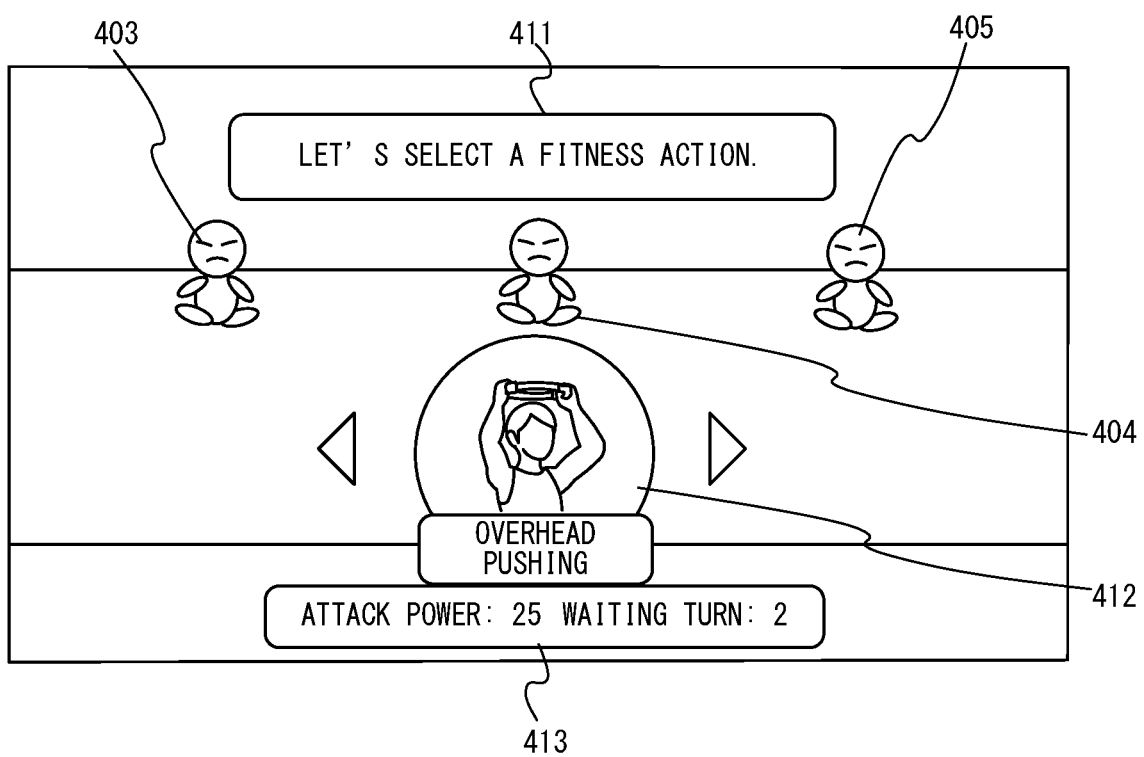
FIG. 15 is a diagram showing an example of a selection image.

FIG. 15 shows an example of the selection image. The selection image includes images 411 to 413 with which the player selects one fitness action from among a plurality of types of selectable fitness actions. These images 411 to 413 are superposed on an image of a game space including the enemy characters 403 to 405 fighting the battle. The image 411 shows a message that urges the player to select a fitness action (specifically, a message "Let's select a fitness action").

In the game of the present embodiment, a plurality of types of fitness actions are prepared as fitness actions that the player can perform in the attack turn to make an instruction in the game. The contents of the plurality of types of fitness actions are optional. In the present embodiment, the plurality of types of fitness actions include: an action of pushing the ring-shaped extension apparatus 5 inward to deform the ring-shaped extension apparatus 5; an action of moving a leg to which the belt-shaped extension apparatus 6 is fastened; and an action of taking a predetermined pose.

Further, in the game of the present embodiment, an action that the player character 401 performs in response to the player having performed a fitness action (i.e., in response to an instruction caused by the fitness action) is associated with each type of fitness action. In the present embodiment, the player character is allowed to perform: a single-target attack that is an action to attack one enemy character; a multi-target attack that is an action to simultaneously attack a plurality of enemy characters; and recovery that is an action of recovering the physical strength of the player character 401. The actions of the player character 401 associated with the fitness actions may differ for the respective types of the fitness actions, or the same action of the player character 401 may be associated with some types of the fitness actions. In the selection event, the player may select a fitness action that he/she desires to perform, or may select a fitness action associated with an action (e.g., multi-target attack) that the player desires to cause the player character 401 to perform.

A selection action image 412 shows one fitness action among the plurality of types of selectable fitness actions. In FIG. 15, the selection action image 412 includes a picture representing a fitness action of "overhead pushing" and the name of the fitness action. In the selection event, the game system 1 accepts a switching instruction performed by the player. According to the switching instruction, the game system 1 switches the fitness action represented by the selection action image 412. In the present embodiment, an order is set for the plurality of types of selectable fitness actions. When a first switching instruction (e.g., an instruction caused by an operation to tilt the analog stick 52 of the right controller 4 leftward), among switching instructions, has been performed, the game system 1 switches the fitness action represented by the selection action image 412 according to the order. When a second switching instruction (e.g., an instruction caused by an operation to tilt the analog stick 52 of the right controller 4 rightward), among the switching instructions, has been performed, the game system 1 switches the fitness action represented by the selection action image 412 according to an order opposite to the above-described order. In the present embodiment, during the battle event, the player may perform the instructions (excluding the instructions caused by fitness actions) through operations to the buttons and the analog sticks of the controllers or operations to move the ring-shaped extension apparatus 5.

As described above, in the selection event, the plurality of types of fitness actions are presented as options. In the present embodiment, the selection action image 412 representing one of the plurality of types of fitness actions as options is displayed. In another embodiment, selection action images respectively representing the plurality of types of fitness actions as options may be simultaneously displayed.

An explanatory image 413 displays an explanation regarding the fitness action represented by the selection action image 412 being displayed. In the present embodiment, the magnitude of an effect achieved by an action (i.e., attack or recovery) of the player character 401 associated with a fitness action (specifically, an amount of damage caused by the attack or an amount of recovery, which is hereinafter referred to as "amount of effect") is calculated based on a basic effect value that is set on the fitness action. Although described later in detail, the amount of effect achieved by the action of the player character 401 is calculated based on the basic effect value and an evaluation result of the fitness action, etc. The explanatory image 413 represents the basic effect value set on the fitness action. For example, in FIG. 15, the explanatory image 413 represents that the basic effect value (here, attack power) set on the fitness action of "overhead pushing" is 25.

In the present embodiment, the number of waiting turns is set on each fitness action. Although details will be described later, the number of waiting turns is the number of turns from when the player performs a fitness action to when the player becomes able to select the fitness action next. The explanatory image 413 indicates the number of waiting turns set on the fitness action represented by the selection action image 412 being displayed. For example, in FIG. 15, the explanatory image 413 indicates that the number of waiting turns set on the fitness action of "overhead pushing" is 2.

While the selection image is displayed, the game system 1 accepts a selection instruction performed by the player. The selection instruction is performed through an operation of pressing a predetermined button on the right controller 4, for example. The game system 1 designates, as the fitness action selected by the player, the fitness action represented by the selection action image 412 being displayed when the selection instruction is performed. Designating a fitness action can also be regarded as designating a fitness event that causes the player to perform the fitness action.

As described above, in the present embodiment, based on the selection instruction performed by the player, the game system 1 designates one type of fitness action from among the plurality of types of fitness actions. Then, the fitness event that causes the player to perform the designated fitness action is executed (details will be described later). Thus, in the present embodiment, the player is allowed to select a fitness action that the player should perform. In another embodiment, the game system 1 may designate a plurality of fitness actions from among the plurality of types of fitness actions, according to a selection instruction performed by the player. In the fitness event, the game system 1 may cause the player to perform the plurality of fitness actions designated.

The plurality of types of fitness actions presented as options may be fixed or variable. The options of the fitness actions may be varied according to at least one of, for example, the progress of the game, settings by the player, the game state (specifically, the types of enemy characters or items possessed by the player character 401). Specifically, the game system 1 may increase the options of the fitness actions as the game progresses, or may increase the options of the fitness actions when the player character 401 acquires (or uses) a predetermined item.

When the fitness action has been selected by the player while the selection image is displayed, the game system 1 ends the selection event, and executes a preparation event (step S2 in FIG. 14). The preparation event is a game event that urges the player to take a posture (referred to as "start posture") at the start of the selected fitness action.

In the case where the action of the player character 401 associated with the selected fitness action is the single-target attack and there are a plurality of enemy characters fighting the battle, the game system 1 displays an image that causes the player to select a target to be attacked, on the display device before the start of the preparation event. When this image is displayed, the game system 1 specifies an enemy character to be attacked from among the plurality of enemy characters, according to an instruction of the player. After the enemy character to be attacked has been specified, the preparation event is started.

In the preparation event, the game system 1 displays a preparation action image of the selected fitness action on the display device. The preparation action image is an image that urges the player to take the start posture of the fitness action.

Figure 16:
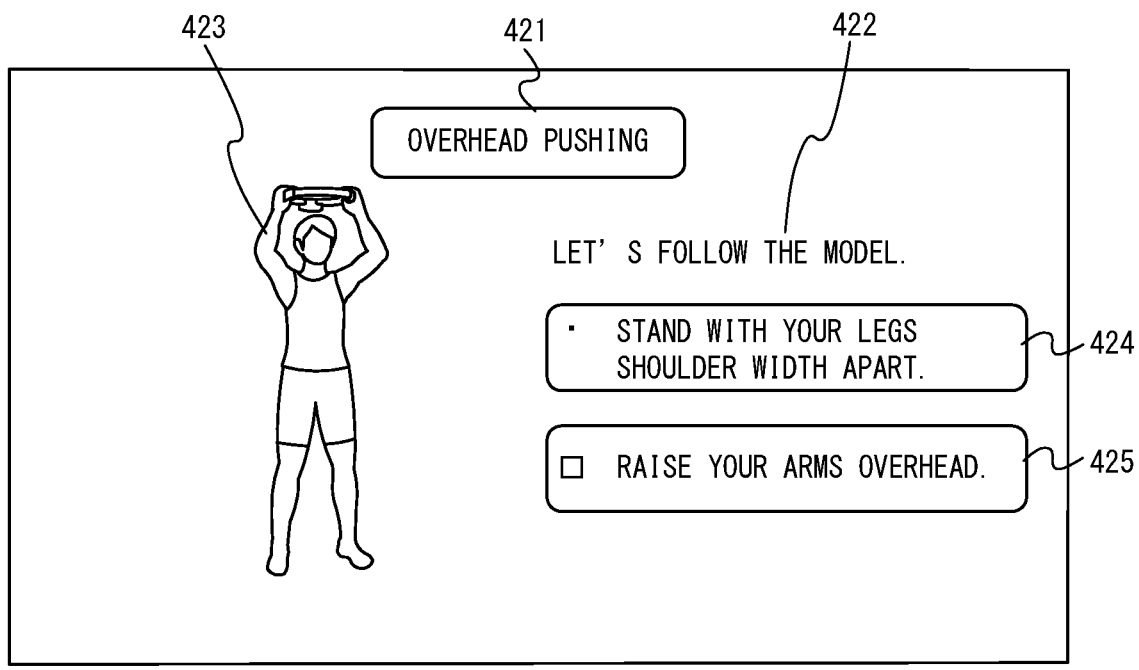
FIG. 16 is a diagram showing an example of a preparation action image.

FIG. 16 shows an example of the preparation action image. As shown in FIG. 16, the preparation action image includes an image 421 representing the fitness action selected by the player (specifically, the name of the fitness action). In addition, the preparation action image includes an image 422 representing a message that urges the player to take the start posture (specifically, a message "Let's follow the model"). Further, the preparation action image includes a start model image 423 representing the model of the start posture of the fitness action. Using the start model image 423, the game system 1 can notify the player of the posture that the player should take as the start posture, in an intuitive and easy-to-understand manner.

As shown in FIG. 16, the preparation action image includes partial posture images 424 and 425. Each partial posture image represents a state that a part of the body of the player should take as the start posture (this state is referred to as "partial start posture"). In FIG. 16, the partial posture image 424 represents a partial start posture regarding the legs of the player (i.e., "Stand with your legs shoulder width apart"), and the partial posture image 425 represents a partial start posture regarding the arms of the player (i.e., "Raise your arms overhead").

In the present embodiment, partial start postures include a posture-with-check that is checked by the game system 1 and a posture-without-check that is not checked by the game system 1. In the example of FIG. 16, the partial start posture represented by the partial posture image 425 is a posture-with-check, and the partial start posture represented by the partial posture image 424 is a posture-without-check. The partial posture image 425 representing the partial start posture as the posture-with-check includes a check box (see FIG. 16).

In the preparation event, the game system 1 determines whether or not the player has taken the posture-with-check. This determination is performed based on an inclination of the controller that is calculated based on an output of the inertial sensor included in the controller, for example. For example, determination as to whether or not the player has taken the partial start posture represented by the partial posture image 425 can be performed by determining whether or not the right controller 4 attached to the ring-shaped extension apparatus 5 has an inclination shown by the start model image 423.

In the preparation event, when the player has maintained the posture-with-check for a predetermined time length (e.g., 3 seconds), the game system 1 determines that the player has taken the start posture. In this case, the game system 1 changes the partial posture image 425 so that the check box is checked, and thereafter, ends the preparation event. At a time point when the player starts to take the posture-with-check, the game system 1 may display, on the display device, a count image representing an elapsed time from the time point (or a remaining time until the player is determined to take the start posture). Completion of the preparation event is followed by start of a fitness event described below.

The number of the partial start postures included in the start posture and the types of the partial start postures (specifically, whether the posture-with-check or the posture-without-check) are set for each type of fitness action. In the present embodiment, the start posture of each fitness action is set so as to include at least one posture-with-check. In the case where a preparation action image regarding a fitness action for which partial start postures including a plurality of postures-with-check are set is displayed, the game system 1 starts counting the elapsed time in response to the player having taken all the postures-with-check. The manner of setting the start posture of each fitness action is optional. For example, in another embodiment, only partial start postures including no posture-with-check may be set for a specific fitness action. In the case where a preparation action image regarding a fitness action for which only partial start postures including no posture-with-check are set is displayed, the game system 1 may start the fitness event after displaying the preparation action image for a predetermined time (e.g., 5 seconds). Further, in the above case, the game system 1 may start the fitness event in response to a start instruction performed by the player.

As described above, in the present embodiment, before a fitness event that causes the player to perform a fitness action, the game system 1 determines whether or not the posture of the player is the posture to be taken at the start of the fitness action. Then, upon determining that the player has taken the posture at the start of the fitness action, the game system 1 starts the fitness event. Thus, the likelihood that the fitness event is started in the state where the player is not ready for the fitness action, can be reduced. Further, depending on the posture at the start of the fitness action, it may be difficult for the player to make an instruction to start the fitness event. Meanwhile, in the present embodiment, since the player need not perform the above instruction in the state where the player is ready for the fitness action, the player can easily start the fitness action from the posture at the start of the fitness event.

The game system 1 executes the fitness event next to the preparation event (step S3 in FIG. 14). The fitness event is a game event that causes the player to perform the fitness action. In the fitness event, the game system 1 displays, on the display device, an image that urges the player to perform the fitness action, and notifies the player of the state of the fitness action that the player has performed (e.g., the number of times the player has performed the fitness action).

Figure 17:
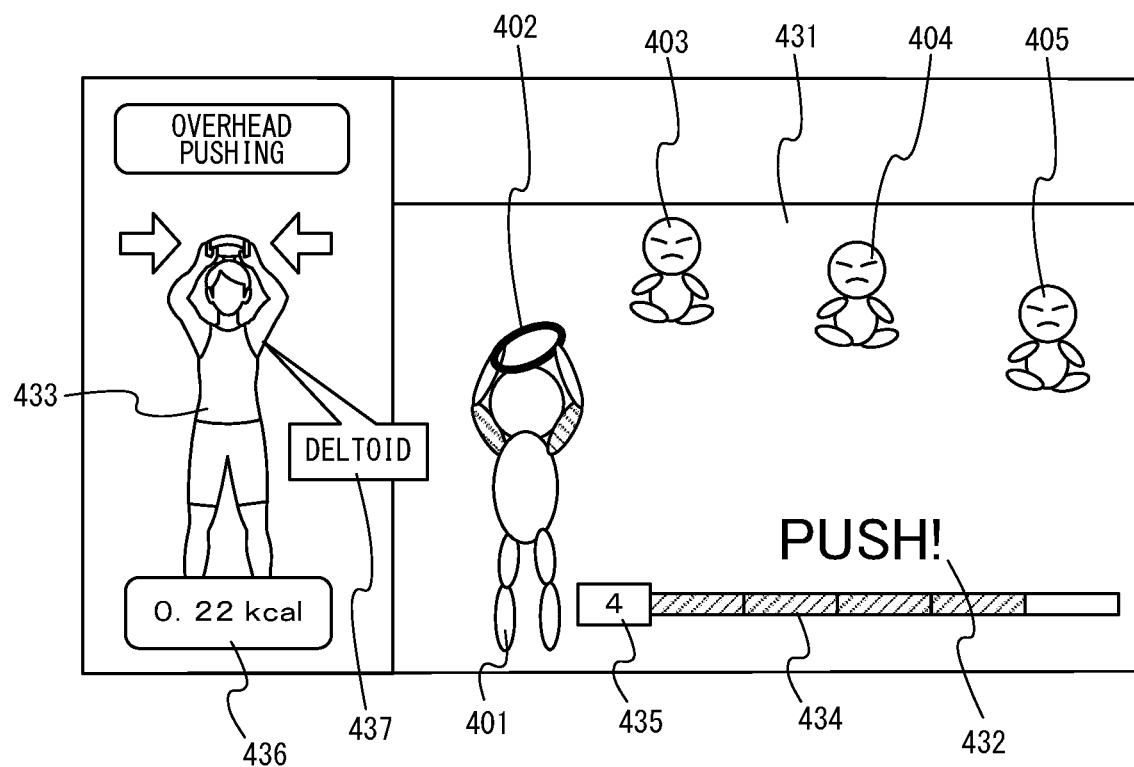
FIG. 17 is a diagram showing an example of an image displayed in a fitness event.

FIG. 17 shows an example of an image displayed in the fitness event. In the fitness event, the game system 1 displays an image 431 representing a game space including the player character 401 and the enemy characters 403 to 405. In addition, the game system 1 displays an image 432 representing a message that urges the player to perform the fitness action (specifically, a message "Push!"). Further, the game system 1 displays a model action image 433, a number-of-times-of-action image 434, a remaining-number-of-times image 435, and a calorie consumption image 436.

The model action image 433 represents a model of the fitness action to be performed by the player (i.e., the fitness action selected in the selection event). In the example of FIG. 17, the model action image 433 includes an image representing an action of inwardly bending the ring-shaped extension apparatus 5 overhead, as a model of the fitness action of "overhead pushing". The model action image 433 allows the player to be notified of the content of the fitness action, in an intuitive and easy-to-understand manner.

The number-of-times-of-action image 434 is a gauge image representing: the number of times the player should perform the fitness action selected in the selection event (referred to as "unit number of times of action"); and the remaining number of times the player should perform the fitness action at this point in time. The remaining-number-of-times image 435 represents a numerical value of the remaining number of times. In the example of FIG. 17, the number-of-times-of-action image 434 represents that the remaining number of times is 4 while the unit number of times of action is 5. In another embodiment, the game system 1 may display an image representing a numerical value of the unit number of times of action and a numerical value of the remaining number of times, instead of (or in addition to) the number-of-times-of-action image 434.

The calorie consumption image 436 represents the calorie consumption caused by the fitness action performed by the player. In the present embodiment, the calorie consumption image 436 represents the calorie consumption caused by the fitness action during one attack turn. However, in another embodiment, the calorie consumption image 436 may represent the calorie consumption caused by the fitness action during one battle event, or may represent accumulated calorie consumption from the start of the game.

The game system 1 calculates the calorie consumption based on the fitness action performed by the player, and displays the calorie consumption image 436 representing the calculated calorie consumption. The method of calculating the calorie consumption based on the fitness action is optional. In the present embodiment, the calorie consumption need not be strictly calculated, and may be roughly calculated. For example, a reference value of calorie consumption per fitness action may be set. Each time one fitness action has been performed, the system 1 may add the reference value of the calorie consumption set for the fitness action to the calorie consumption up to then, thereby calculating the calorie consumption.

In the fitness event, the player performs the fitness action while watching the model action image 433 according to need. In the present embodiment, in response to the player having performed the fitness action in the fitness event, the game system 1 controls the player character 401 so as to perform the same fitness action as the player.

The fitness action of "overhead pushing" is an action of deforming the ring-shaped extension apparatus 5 by pushing it inward, maintaining the deformed state for a predetermined time, and returning the ring-shaped extension apparatus 5 to the original state. For example, when the fitness action of "overhead pushing" has been performed, the game system 1 calculates the deformed state of the ring-shaped extension apparatus 5 (specifically, the direction and amount of deformation), and controls the action of the player character 401 so as to deform the ring object 402 in accordance with the calculated deformed state. Specifically, the game system 1 controls the action of the player character 401 so that the calculated deformed state of the ring-shaped extension apparatus 5 coincides with the deformed state of the ring object 402. Therefore, when the player has performed the fitness action of "overhead pushing", the player character 401 is controlled so as to perform the fitness action of "overhead pushing" in the same manner as the player.

When the fitness action of "overhead pushing" is performed, the game system 1 displays the image 432 representing a message "Push!" in the state where the ring-shaped extension apparatus 5 is not deformed. In addition, in the above state, the game system 1 displays, as the model action image 433, an image representing an action of pushing the ring-shaped extension apparatus 5 inward (see FIG. 17). Further, although not shown in the drawings, in the state where the ring-shaped extension apparatus 5 has been deformed by a predetermined amount or more, the game system 1 displays an image representing a message "Keep!", and displays, as the model action image 433, an image representing the ring-shaped extension apparatus 5 being pushed inward and maintained. Further, when the state where the ring-shaped extension apparatus 5 is deformed has been maintained for the predetermined time, the game system 1 displays an image representing a message "Return to the original state", and displays, as the model action image 433, an image representing an action of returning the ring-shaped extension apparatus 5 being pushed inward to the original state. Thus, the game system 1 displays the image that urges the player to take an action that he/she should take next, according to the state of the player during the fitness action. This allows the player to be specifically notified of how to move in the fitness action.

As shown in FIG. 17, in the fitness event, the game system 1 displays a part, of the player character 401, which corresponds to the fitness action in an emphasized manner as compared to other parts different from this part. The "part corresponding to the fitness action" is a part that the player mainly uses in the fitness action (this part can also be regarded as a part trained through the fitness action or a part on which the fitness action works). In the present embodiment, a part corresponding to each fitness action is associated with the fitness action. In the example of FIG. 17, parts of the player character 401, which correspond to the upper arms of the player that the player uses for the fitness action of "overhead pushing", are brightly displayed (in FIG. 17, the brightly displayed parts are indicated by hatching).

As shown in FIG. 17, the model action image 433 includes a word balloon image 437 that points a part, corresponding to the fitness action, of a person simulating a player in the model action image 433. In the present embodiment, the word balloon image 437 indicates the name of a muscle (here, "deltoid") used in the fitness action.

As described above, in the present embodiment, during the fitness event, the game system 1 displays, on the display device, the image simulating the body of the player (i.e., the model action image 433) and the image of the body of the player character 401. Of the images of the bodies, a part corresponding to the fitness action that the player should perform during the fitness event is displayed in an emphasized manner (e.g., this part is displayed in a different color, or this part is pointed by a word balloon image). This allows the player to be notified of the part on which the fitness action works, in an easy-to-understand manner.

In the present embodiment, the game system 1 displays, as the images representing the parts corresponding to the fitness action, both the image representing the part of the body of the player character 401 and the image representing the part of the body of the player (i.e., the model action image 433). In another embodiment, the game system 1 may display only one of the above two images. Even in this case, the same effect as that of the present embodiment can be achieved.

The emphasis display of the part corresponding to the fitness action may be constantly performed during the fitness event, or may be performed in a predetermined period (e.g., a period in which the player is performing the fitness action) in the fitness event.

The fitness event is ended in response to the player having completed one fitness action. Each time the player has completed one fitness action, the game system 1 updates the remaining number of times indicated by the number-of-times-of-action image 434 and the remaining-number-of-times image 435.

Next to the fitness event, the game system 1 executes an attack event (step S4 in FIG. 14). The attack event is a game event in which the player character 401 performs an attack on an enemy character. In the attack event, the game system 1 displays, on the display device, an image representing a state in which the enemy character is damaged by the attack performed on the enemy character by the player character 401. As described above, in the present embodiment, an attack is performed on the enemy character by the player character 401 in response to the player having performed a fitness action during the fitness event. That is, in the present embodiment, the fitness action performed by the player during the fitness event indicates an attack instruction, and the attack on the enemy character by the player character 401 is performed in response to the attack instruction caused by the fitness action.

Figure 18:
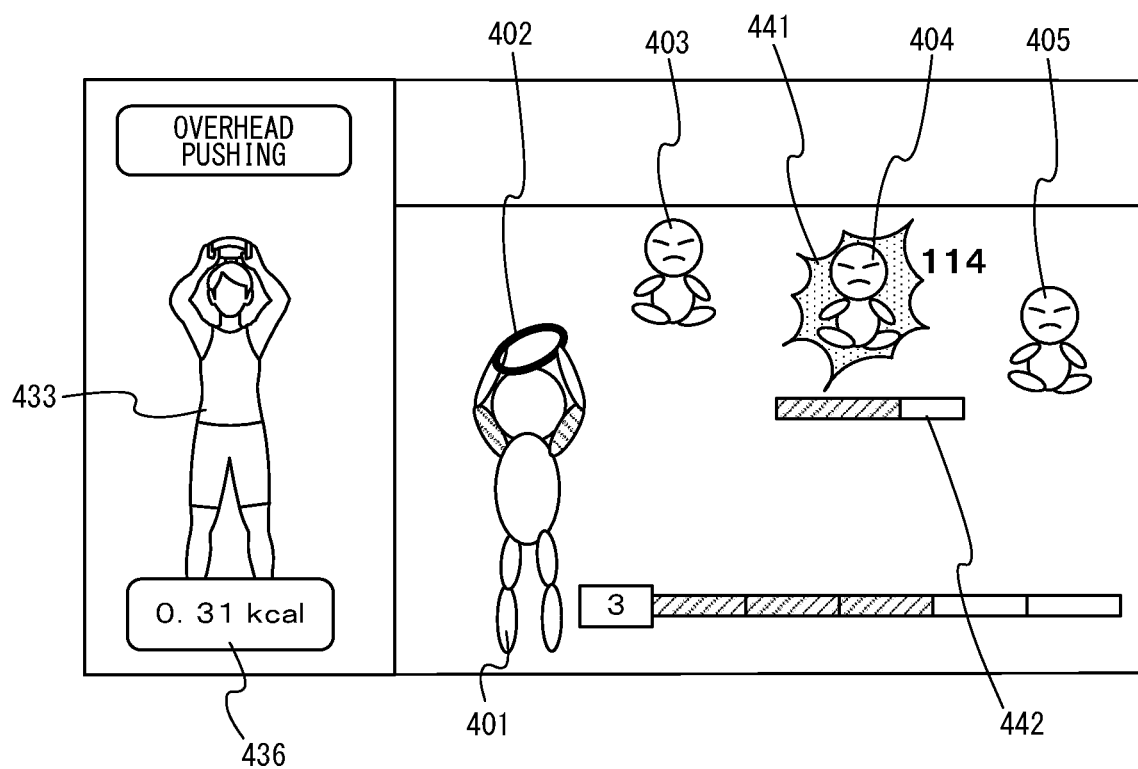
FIG. 18 is a diagram showing an example of an image displayed in an attack event.

FIG. 18 shows an example of an image displayed in the attack event. In the attack event, the game system 1 displays an effect image 441 representing an attack performed on the enemy character by the player character 401. In the present embodiment, the game system 1 causes the player character 401 to perform an attack action on the enemy character, according to an action different from the fitness action caused by the fitness action performed by the player during the fitness event. For example, in the fitness event, the game system 1 controls the action of the player character 401 such that the player character 401 accumulates magical power according to the fitness action of the player, whereas, in the attack event, the game system 1 controls the action of the player character 401 such that the player character 401 attacks the enemy character with a magic that causes the accumulated magical power to be emitted from the ring object 402.

Further, the game system 1 displays a numerical value (in FIG. 18, "114") indicating the amount of damage given to the enemy character. The calculation method for the amount of damage (in other words, the amount of decrease in physical strength) will be described layer. In addition, the game system 1 displays a gauge image 442 representing the physical strength of the attacked enemy character. The gauge image 442 is displayed to be changed such that the physical strength decreases by the amount of damage.

When the action of the player character 401 associated with the fitness action is "recovery", the game system 1, in the attack event, displays the effect image representing that the physical strength of the player character 401 is recovered, and displays a numerical value indicating the amount of recovery. In addition, the game system 1 displays a gauge image representing the physical strength of the player character 401 to be changed such that the physical strength is increased by the amount of recovery. Then, the attack event is ended.

When the enemy character has been damaged in the attack event, the game system 1 determines whether or not the enemy character has been defeated (i.e., whether or not the vitality value has become 0). When all the enemy characters have been defeated, the game system 1 ends the battle event. In this case, the player character 401 has won the battle, and the achievement condition set for the battle event has been satisfied.

Meanwhile, in the case where some enemy character remains undefeated, if the fitness action has not been performed by the unit number of times of action (in other words, if the fitness event has not been performed by the unit number of times of action), the fitness event is executed again (see FIG. 14). At this time, the fitness event and the attack event are repeatedly executed until reaching the unit number of times of action or until all the enemy characters are defeated.

In the case where the fitness event and the attack event have been executed by the unit number of times of action and some enemy character still remains undefeated, the game system 1 ends the attack turn (see FIG. 14). When the attack turn has been ended, a defense turn is started. Hereinafter, the game flow in the defense turn of the player character 401 will be described.

When the defense turn has been started, the game system 1 executes a fitness event (step S5 in FIG. 14). In the present embodiment, the fitness action to be performed by the player in the defense turn is set to a predetermined fitness action (here, a fitness action of "abdomen pushing"). That is, a selection event in which the player selects a fitness action is not executed in the defense turn. Also, a preparation event in which a preparation action image is displayed is not executed in the defense turn. In another embodiment, even in the defense turn, a preparation event may be executed as in the attack turn. In still another embodiment, even in the defense turn, a selection event may be executed as in the attack turn.

Figure 19:
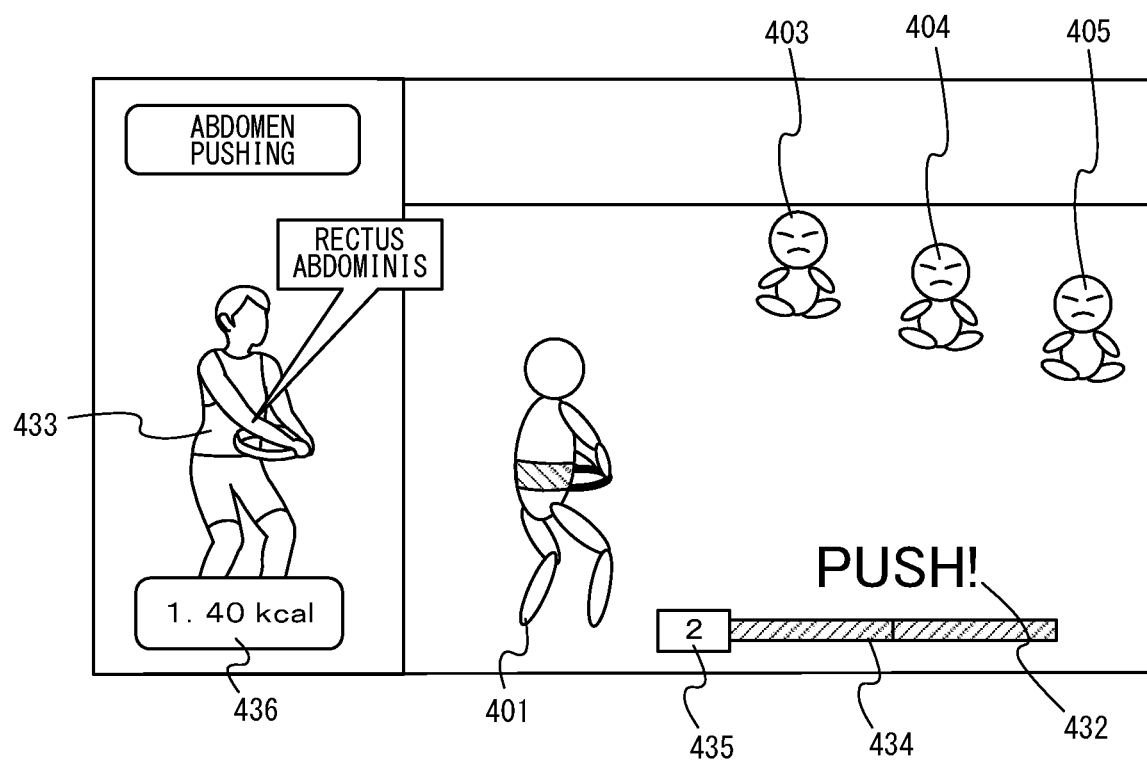
FIG. 19 is a diagram showing an example of an image displayed in a fitness event in a defense turn.

FIG. 19 shows an example of an image displayed in the fitness event in the defense turn. In the fitness event in the defense turn, as in the fitness event in the attack turn, the game system 1 displays, on the display device, an image 431 representing a game space including the player character 401 and the enemy characters 403 to 405. In addition, the game system 1 displays the image 432 representing a message that urges the player to perform the fitness action (in the example of FIG. 19, a message "Push!"), the model action image 433, the number-of-times-of-action image 434, the remaining-number-of-times image 435, and the calorie consumption image 436. In the example shown in FIG. 19, the model action image 433 includes an image of a model of the fitness action of "abdomen pushing". As for the "abdomen pushing" that is the fitness action performed in the defense turn, the unit number of times of action is set to 2, and the number-of-times-of-action image 434 represents that the unit number of times of action is 2 and the remaining number of times is 2.

In the defense turn, as in the attack turn, when the player has performed the fitness action, the game system 1 controls the player character 401 so as to perform the same fitness action as the player. Further, the game system 1 displays a part, of the player character 401, which corresponds to the fitness action (in FIG. 19, abdomen) in an emphasized manner as compared to other parts different from this part. In addition, the model action image 433 includes a word balloon image 437 that points a part, corresponding to the fitness action, of the person simulating a player in the model action image 433. The word balloon image 437 indicates the name of a muscle (here, "rectus abdominis") that is exercised in the fitness action.

The fitness action of "abdomen pushing" is an action of deforming the ring-shaped extension apparatus 5 such that one side of the apparatus 5 is applied to the abdomen and the other side thereof is pushed inward, and maintaining the deformed state for a predetermined time. When the player has ended the fitness action in the fitness event in the defense turn, the fitness event is ended. Specifically, when the player has maintained, for the predetermined time, the state where the ring-shaped extension apparatus 5 is deformed with one side thereof being applied to the abdomen and the other side thereof being pushed inward, the fitness event is ended. That is, the game system 1 determines whether or not the state where the ring-shaped extension apparatus 5 is deformed has been maintained for the predetermined time. When the determination result is that the state has been maintained, the game system 1 ends the fitness event. Next to the fitness event, the game system 1 executes a defense event (step S6 in FIG. 14).

Figure 20:
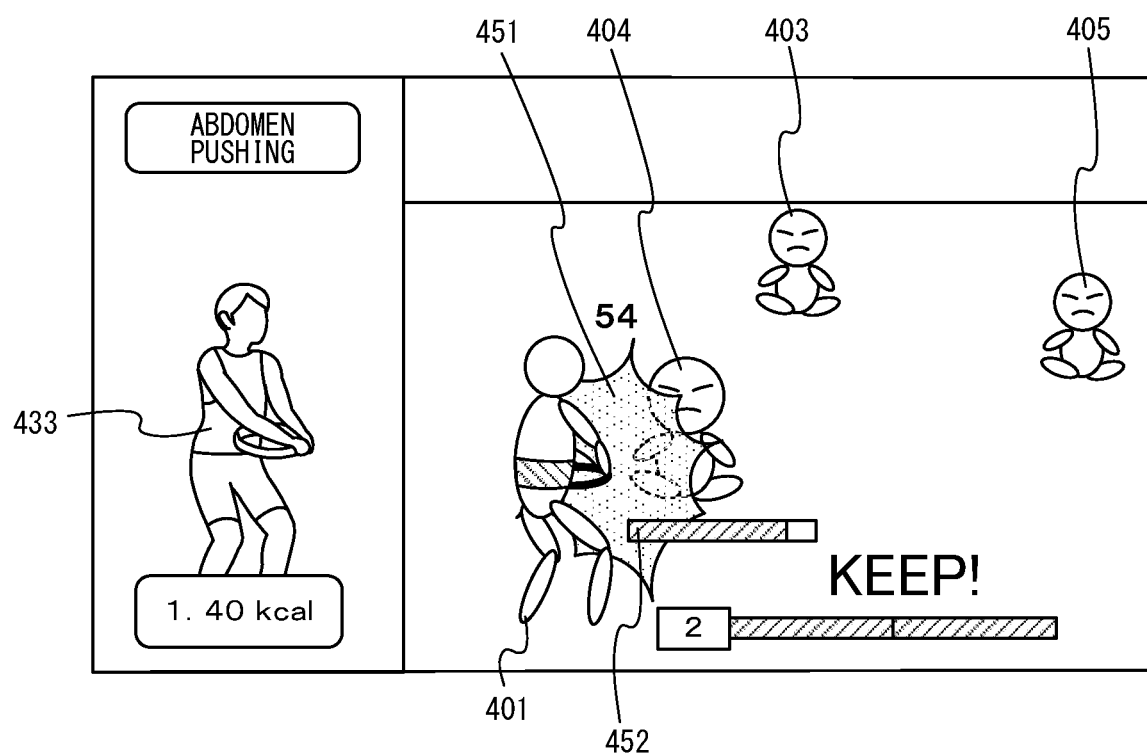
FIG. 20 is a diagram showing an example of an image displayed in a defense event in the defense turn.

FIG. 20 shows an example of an image displayed in the defense event in the defense turn. In the defense event, the game system 1 displays a game image representing a state where an enemy character (here, the enemy character 404) performs an attack on the player character 401. At this time, the game system 1 displays an effect image 451 representing the attack on the player character 401 by the enemy character. In addition, the game system 1 calculates an amount of damage given to the player character 401, and displays a numerical value (in FIG. 20, "54") indicating the amount of damage. The calculation method for the amount of damage (in other words, the amount of decrease in physical strength) will be described layer. Further, in the defense event, the game system 1 displays a gauge image 452 representing the physical strength of the attacked player character 401. The gauge image 452 is displayed to be changed such that the physical strength is decreased by the amount of damage. When the above display has been ended, the defense event is ended.

When the player character 401 has been damaged in the defense event, the game system 1 determines whether or not the player character 401 has been defeated (i.e., whether or not the vitality value has become 0). When the player character 401 has been defeated, the game system 1 ends the battle event. In this case, the player character 401 has been defeated in the battle, and the achievement condition set for the battle event has not been satisfied.

Meanwhile, in the case where the player character 401 has not been defeated, if the fitness event (in other words, the fitness action) has not been executed by the unit number of times of action, the fitness event is executed again (see FIG. 14). At this time, the fitness event and the defense event are repeatedly executed until reaching the unit number of times of action or until the player character 401 is defeated.

In the case where the fitness event has been executed by the unit number of times of action and the player character 401 is not defeated, the defense turn is ended (see FIG. 14). When the defense turn has been ended, the attack turn is performed again. Thereafter, the attack turn and the defense turn are alternately repeated until the player character 401 is defeated or all the enemy characters are defeated.

As described above, in the present embodiment, the game system 1 executes an attack event of attacking an enemy character in response to a fitness action that the player has performed during a first fitness event in an attack turn, and executes a second fitness event (i.e., a fitness event in a defense turn) different from the first fitness event during a battle event. Then, the game system 1 executes a defense event of defending against an attack from the enemy character in response to a fitness action that the player has performed during the second fitness event. Thus, the fitness actions are reflected regarding both the attack and the defense in the battle event, and therefore, the opportunity to cause the player to perform the fitness action can be increased.

Further, in the present embodiment, the fitness action to be performed by the player in the second fitness event is determined independently of an instruction of the player (in other words, determined without an instruction of the player). That is, the second fitness event is determined independently of an instruction of the player. Therefore, in the defense turn, the fitness event is started without selection of a fitness action by the player. Thus, the game flow in which the player character 401 defends against an attack from the enemy character is not interrupted by a selection event, and therefore, the game system 1 can execute the game in a good tempo.

In the present embodiment, the player performs one type of fitness action in the defense turn. In another embodiment, one fitness action may be designated from among a plurality of types of fitness actions. At this time, as in the present embodiment, the fitness action may be designated independently of an instruction of the player. Specifically, the fitness action may be designated according to an algorithm defined in the game program, and may not be selected by the player. Even in this case, as in the present embodiment, the game in which the player character 401 defends against an attack from the enemy character can be executed in a good tempo. In another embodiment, even in the defense turn, the player may select a fitness action as in the attack turn.

2-2. Progress of Game According to Battle Event

In the game of the present embodiment, the above-described battle event is repeatedly executed. For example, the game system 1 executes the battle event each time the player character 401 meets an enemy character while moving on a map. In addition, the game system 1 progresses the game in accordance with achievement of each battle event. For example, the game system 1 progresses the game in response to the player character 401 having won in the battle with a specific enemy character. The phrase "progressing the game" may indicate any processing for progressing the game state, such as allowing the player character 401 to enter a new stage, causing the game story to proceed, or giving a new ability or item to the player character 401. As described above, in the present embodiment, the player progresses the game while repeating the battle event. That is, the player progresses the game by repeatedly performing fitness actions in the game.

2-3. Game Processing Based on Fitness Action

As described above, in the present embodiment, the game system 1 executes game processing based on a fitness action performed by the player. Specifically, the game system 1 performs evaluation on the fitness action performed by the player, and calculates, based on an evaluation result, an amount of effect (i.e., an amount of damage or an amount of recovery) achieved by an action of the player character 401 associated with the fitness action. Hereinafter, a method for calculating an amount of effect based on a fitness action will be described.

First, a method for evaluating a fitness action will be described. In the present embodiment, a plurality of types of fitness actions can be classified into three groups, i.e., a keep action group, a repeat action group, and a pose action group. The game system 1 evaluates the fitness actions by different methods according to the three groups. In the present embodiment, the game system 1 calculates an evaluation score as an evaluation result of each fitness action. The higher the evaluation score is, the better the evaluation result is.

A fitness action that belongs to the keep action group includes an action in which the player moves his/her body (or a part of the body) from the above-described start posture to a predetermined posture (referred to as "keep posture") and maintains the keep posture for a predetermined time. For example, above-described "overhead pushing" and "abdomen pushing" are fitness actions that belong to the keep action group. The fitness action that belongs to the keep action group is not limited to the fitness actions in which the player moves his/her arms. For example, the keep action group may include a fitness action in which the player, in an upright start posture, bends his/her knees like a squat to take a keep posture, maintains the keep posture for a predetermined time, and returns to the start posture.

Regarding the fitness action that belongs to the keep action group, the game system 1 calculates an evaluation score upon evaluating that the player takes a proper keep posture and that the player maintains the keep posture for a sufficient time. Specifically, the evaluation score is calculated as follows.

First, the game system 1 calculates an evaluation coefficient, based on a difference between an inclination of a part of the body of the player being in the keep posture, and a set ideal value. The evaluation coefficient is calculated to be a larger value as the inclination of the part of the body of the player is closer to the ideal value within a predetermined range (e.g., a range from 0 to 1).

Next, in the case where the player has maintained the inclination according to the calculated evaluation coefficient for a duration time according to the evaluation coefficient in the period when the player takes the keep posture, the game system 1 adds an evaluation score. During the above period, the game system 1 cumulatively adds the evaluation score, and provides the cumulatively added evaluation score as the evaluation result. The duration time is set according to the evaluation coefficient. The higher the evaluation coefficient is, the shorter the duration time is. For example, the duration time is set as follows:

- duration time t=3 (frame time) when evaluation coefficient a=1;
- duration time t=5 (frame time) when evaluation coefficient satisfies 1>a≥0.9;
- duration time t=10 (frame time) when evaluation coefficient satisfies 0.9>a≥0.6;
- duration time t=20 (frame time) when evaluation coefficient satisfies 0.6>a≥0.3; and
- duration time t=40 (frame time) when evaluation coefficient satisfies 0.3>a≥0.

Thus, in the period when the player takes the keep posture, if the inclination of the part of the body of the player is close to the ideal value, the evaluation score is added in a short time, whereas if the inclination of the part of the body of the player deviates from the ideal value, the evaluation score is not added soon. Therefore, in the present embodiment, in the period when the player takes the keep posture, if the player takes a good posture (i.e., a posture with the inclination being close to the ideal value), more evaluation scores are added, resulting in a high total evaluation score. Further, assuming that the player maintains the keep posture with a certain inclination, more evaluation scores are added and a higher total evaluation score is attained in the case where the time to maintain the keep posture is long than in the case where the time to maintain the keep posture is short.

A fitness action that belongs to the repeat action group is an action that causes the player to repeatedly perform a predetermined exercise by a predetermined number of times during one fitness action. For example, the repeat action group may include a fitness action in which the player repeatedly performs high-knees by a predetermined number of times, and a fitness action in which the player performs an exercise to twist the body rightward and leftward by a predetermined number of times.

Regarding the fitness action that belongs to the repeat action group, the game system 1 calculates an evaluation score, based on an inclination of a part of the body of the player when the player performs the predetermined exercise and on an acceleration of the part of the body. Specifically, the game system 1 calculates an evaluation score so as to be increased according to the magnitude of the inclination, with respect to a predetermined reference, obtained when the player performs the predetermined exercise. In addition, the game system 1 calculates the evaluation score so as to be increased according to the magnitude of the acceleration obtained when the player performs the predetermined exercise. That is, regarding the fitness action that belongs to the repeat action group, the player can attain a high evaluation score by performing the predetermined exercise powerfully (i.e., with the acceleration being increased) and steadily (i.e., with the inclination being increased with respect to the reference). In the present embodiment, the game system 1 calculates an evaluation score each time the predetermined exercise has been performed, and totalizes the evaluation scores obtained through a plurality of times of the predetermined exercise, thereby calculating an evaluation score in one fitness action.

In another embodiment, regarding the fitness action that belongs to the repeat action group, the game system 1 may calculate an evaluation score, based on the speed at which the player has performed a predetermined number of times of the predetermined exercise (in other words, the time required for the predetermined number of times of the predetermined exercise). Specifically, the game system 1 may calculate the evaluation score so as to be increased as the speed becomes higher (in other words, as the time becomes shorter). In this case, regarding the fitness action that belongs to the repeat action group, the player can attain a high evaluation score by performing the exercise quickly.

The fitness action that belongs to the pose action group is an action in which the player changes his/her posture from a predetermined first posture to a second posture different from the first posture. For example, the pose action group includes a fitness action in which the player changes his/her posture from the first posture in which the player stands upright to the second posture in which the player bends the knees and stretches the arms upward.

Regarding the fitness action that belongs to the pose action group, the game system 1 calculates an evaluation score, based on an elapsed time from when the player takes the first posture to when the player takes the second posture. Specifically, the game system 1 calculates the evaluation score so as to be increased with an increase in the elapsed time. That is, regarding the fitness action that belongs to the pose action group, the player can attain a high evaluation score when the player performs the action of changing the posture slowly. In the present embodiment, an upper limit is set to the evaluation score. Therefore, the evaluation score takes an upper limit value when the elapsed time is equal to or longer than a certain time. That is, the evaluation score is not increased even if the elapsed time exceeds the certain time.

Regarding the fitness action that belongs to any of the three groups described above, the game system 1 acquires action data based on an output of the sensor (e.g., an output of the strain gauge or the inertial sensor) according to the fitness action performed by the player, and calculates an evaluation score based on the action data. The action data is data indicating the content of the fitness action performed by the player. In the present embodiment, the action data is data indicating the output of the strain gauge and/or the inertial sensor. In another embodiment, the action data may be data obtained when the output of the strain gauge and/or the inertial sensor is subjected to some processing (e.g., conversion of data format and/or calculation on the output value, etc.).

Regarding the fitness action that belongs to the keep action group, the game system 1 can calculate an inclination of a part of the body of the player who is taking the keep posture, based on an amount of deformation of the ring-shaped extension apparatus 5 or an inclination of the controller. The amount of deformation of the ring-shaped extension apparatus 5 is calculated based on an output of the strain gauge which is indicated by the operation data (specifically, the ring operation data). The inclination of the controller is calculated based on an output of the inertial sensor which is indicated by the operation data (specifically, the left controller operation data or the right controller operation data). In the case where the keep posture is a posture of the player pushing the ring-shaped extension apparatus 5 inward, the game system 1 can calculate an inclination of a part (here, arms) of the body of the player, based on the amount of deformation of the ring-shaped extension apparatus 5. Meanwhile, in the case where the keep posture is a posture of the player bending the knees, the game system 1 can calculate an inclination of a part (here, legs) of the body of the player, based on an inclination of the left controller 3 attached to the leg of the player. Then, the game system 1 can calculate an evaluation score through the above-described method, based on the calculated inclination of the part of the body of the player.

Regarding the fitness action that belongs to the repeat action group, the game system 1 can calculate, based on an inclination and an acceleration of the controller, an inclination and an acceleration of a part of the body of the player when the player has repeatedly performed the predetermined exercise by the predetermined number of times. The inclination of the controller can be calculated based on an output of the angular velocity sensor which is indicated by the action data. The acceleration of the controller can be calculated based on an output of the acceleration sensor which is indicated by the action data. For example, when the predetermined exercise is high-knees, the game system 1 can calculate the inclination of a part (here, legs) of the body of the player, based on the inclination of the left controller 3 attached to the leg of the player, and can calculates the acceleration of the part of the body, based on the acceleration of the left controller 3.

Regarding the fitness action that belongs to the pose action group, the game system 1 can determine that the player has taken the first posture and that the player has taken the second posture, based on inclinations of the controllers. For example, in the case where the player takes, as the second posture, a posture of bending the knees and stretching the arms upward, the game system 1 can determine that the player is taking the posture of bending the knees, based on the inclination of the left controller 3 attached to the leg of the player, and can determine that the player is taking the posture of stretching the arms upward, based on the inclination of the right controller 4 attached to the ring-shaped extension apparatus 5 held by the player. Then, based on these determination results, the game system 1 can calculate the elapsed time from when the player takes the first posture to when the player takes the second posture, and thereby can calculate an evaluation score.

For example, if the player has poor body flexibility or the player is suffering from an injury in the body, it may be difficult for the player to take the first or second posture. Therefore, in the present embodiment, when a predetermined time has passed in the state where it is not determined that the player has taken the first or second posture, the game system 1 changes a threshold value so that it is more easily determined that the player has taken the first or second posture. An exemplary case is considered in which, in a process of calculating an evaluation result of a certain fitness action, when an angle of the right controller 4 in a certain direction becomes equal to or larger than a threshold value (specifically, 90°), it is determined that the player has taken the second posture. In this case, when the predetermined time has passed in the state where the angle of the right controller 4 in the certain direction is less than 90°, the game system 1 changes the threshold value used for the determination to a value (e.g., 80°) obtained by decreasing the threshold value from 90° by a predetermined value. As the result, when the player has taken a posture in which the angle of the right controller 4 in the certain direction is 80°, it is determined that the player has taken the second posture. Thereafter, in the process of calculating the evaluation result of the fitness action, the game system 1 performs the determination by using the changed threshold value. Even in the case where the game system 1 has performed the determination by using the change threshold value, if the predetermined time has passed in the state where it is not determined that the player has taken the first or second posture, the game system 1 may further decrease the changed threshold value by the predetermined value. A lower limit value may be set on the threshold value.

In another embodiment, in the above case, the game system 1 may change the threshold value, based on the posture of the player which has not reached the predetermined target posture. For example, in the above case, when it is determined that the player has maintained, for a predetermined time, a posture in which the angle of the right controller 4 in the certain direction is 70°, the game system 1 may change the threshold value used for the determination from 90° to 70°. Thus, based on the posture actually taken by the player, the game system 1 may change the threshold value so as to allow the determination that the posture of the player has reached the target posture.

Further, an exemplary case is considered in which, in a process of calculating an evaluation result of a certain fitness action, it is determined that the player has taken the second posture when the player has deformed the ring-shaped extension apparatus 5 by a predetermined amount A. In this case, when the amount of deformation of the ring-shaped extension apparatus 5 has been maintained to be less than the predetermined amount A for a predetermined time, the game system 1 changes the threshold value for the determination to a value B smaller than the predetermined amount A. As the result, it is determined that the player has taken the second posture when the player has taken the posture in which the amount of deformation of the ring-shaped extension apparatus 5 is the value B.

In the above example, the game system 1 changes the threshold value when determining the second posture in the fitness action that belongs to the pose action group. In another embodiment, the game system 1 may also change the threshold value when determining a posture in a fitness action that belongs to another group different from the pose action group.

As described above, in the present embodiment, in a fitness event that causes the player to perform a fitness action of taking a predetermined target posture, when it is determined, based on action data, that the state where the posture of the player has not reached the target posture has been continued for a predetermined time, the game system 1 changes a threshold value used for the determination so that it is more easily determined that the player has taken the target posture. In other words, in the fitness event, when the state where the action data acquired during the fitness event has not reached a value corresponding to the target posture has been continued for the predetermined time, the game system 1 updates the threshold value regarding the target posture so that the action data more easily reaches the value corresponding to the target posture. Thus, the player can perform the fitness action without taking an unnatural posture. Further, in the present embodiment, since the threshold value is automatically changed during the period in which the fitness event is performed, the player need not perform an operation to change the setting, thereby saving the player's time and labor.

The game system 1 may determine that the player has taken a target posture, on the condition that the posture of the player, which has not reached the target posture, is close to the target posture (e.g., a difference between an inclination of a part of the body of the player in the state not reaching the target posture and an inclination of the part of the body in the target posture is equal to or less than a predetermined value).

The above evaluation method is an example, and the game system 1 may evaluate a fitness action by any method. In another embodiment, the game system 1 may evaluate a fitness action based on calorie consumption through the fitness action, or may evaluate a fitness action based on an exercise intensity of the fitness action.

The game system 1 calculates an amount of effect achieved by an action of the player character 401, based on the evaluation result calculated as described above. In the present embodiment, the amount of effect is calculated based on at least information as follows:

an evaluation result of a fitness action;
a basic effect value set for each type of fitness action; and
a player parameter.

By calculating the amount of effect based on the evaluation result, the game system 1 can change the amount of decrease in a vitality value of an enemy character in accordance with the result of evaluation on a fitness action performed by the player. Thus, the player is motivated to improve the quality of the fitness action to attain a good evaluation result.

The basic effect value is set for each type of fitness action. As described above, the explanatory image 413 displayed in a selection event represents a basic effect value set for a fitness action. When the action of the player character 401 is attack, the basic effect value is an attack power of the action. When the action of the player character 401 is recovery, the basic effect value is a recovery power of the action. When the action of the player character 401 is defense, the basic effect value is a defensive power of the action.

By using the basic effect value, the game system 1 can change the amount of decrease in the vitality value of the enemy character, in accordance with the type of the fitness action to be performed by the player (in other words, in accordance with the type of the fitness event). Thus, strategic characteristics of the game can be improved. Further, since the effect on the game varies depending on the type of the fitness action, the player can be motivated to perform various types of fitness actions.

As described above, in the present embodiment, the game system 1 changes the amount of decrease in the vitality value of the enemy character, in accordance with the content of the fitness action. The phrase "changing (the above amount) in accordance with the content of the fitness action" may mean changing in accordance with evaluation regarding action data acquired during a battle event (e.g., evaluation as to whether the action data indicates an effective fitness action, that is, an evaluation result of the fitness action), or changing in accordance with the type of the fitness action.

Meanwhile, the phrase "changing (the above amount) in accordance with the content of the fitness action" may mean changing in accordance with a load on the fitness action. The load on the fitness action may be a value that is set in advance of the fitness event (e.g., a value that is set regarding the fitness event and indicates the load on the fitness action corresponding to the fitness event), or may be a value calculated based on the fitness action that the player has performed during the fitness event. For example, the amount of decrease in the vitality value of the enemy character may be set larger in the case where the load on the fitness action is great (e.g., when the unit number of times of action is large, or the reference value of calorie consumption set for the fitness action is large) than in the case where the load on the fitness action is small. For example, regarding the basic effect value that is set for each type of fitness action, the game system 1 may set the basic effect value in accordance with the load set on the fitness action (specifically, so that the larger basic effect value is set on the fitness action having the greater load). Alternatively, the game system 1 may calculate the load on the fitness action that the player has actually performed, and may set the amount of decrease in the vitality value of the enemy character to be larger when the calculated load is greater. For example, when evaluating the fitness action, the game system 1 may perform the evaluation so that the greater the calculated load is, the higher the evaluation score is. Since the player can attain a good game result by steadily performing the fitness action, the player can be motivated to improve the quality of the fitness action.

The player parameter is a parameter associated with a player (or a player character). The game system 1 sets the player parameter so as to be increased as the game progresses. For example, the player parameter may be increased in response to the player character having defeated the enemy character in the battle event, or may be increased in response to the game story having proceeded. An example of proceeding of the game story is the player character 401 entering a new game stage. Meanwhile, in the case where an empirical value and a level are set on the player character 401 and the level of the player character 401 increases with increase in the empirical value, the player parameter may be increased with increase in the level and/or the empirical value.

The amount of effect achieved by the action of the player character 401 is calculated to be greater as the above-described three parameters (i.e., the evaluation result, the basic effect value, and the player parameter) are greater. For example, the amount of effect may be calculated by multiplying the basic effect value by the evaluation score and the player parameter.

The game system 1 may calculate the amount of effect achieved by the action of the player character 401, based on another parameter in addition to the above-described three parameters. In the present embodiment, the amount of effect may also be calculated based on physical information (specifically, exercise ability information) described later. For example, when the action of the player character 401 is attack, the game system 1 may calculate an amount of damage of the enemy character, based on a defensive power of the enemy character in addition to the above-described three parameters. Meanwhile, for example, when the action of the player character 401 is defense, the game system 1 may calculate an amount of damage of the player character 401, based on an attack power of the enemy character in addition to the above-described three parameters.

As described above, in the present embodiment, the amount of effect achieved by the action of the player character 401 is determined based on the evaluation result of the fitness action performed by the player. In addition, the amount of effect is determined based on the player parameter. In the present embodiment, in the battle event, the game system 1 makes a stronger enemy character (e.g., a character with a higher physical strength, a higher attack power, and/or a higher defensive power) more likely to appear as the game progresses. Specifically, after a battle event in which a first enemy character appears has been achieved by the player, the game system 1 executes a battle event in which a second enemy character having a greater vitality value than the first enemy character appears. This enables the player to sufficiently enjoy the sense of achievement in the game.

In order to defeat such a strong enemy character, the player performs the fitness action so as to increase the amount of effect. However, the exercise ability of the player is not always noticeably improved. In actuality, the exercise ability of the player may be a little improved or may be hardly improved. Therefore, if the amount of effect is determined based on only the evaluation result of the fitness action, the amount of effect is not increased very much when a stronger enemy character appears as the game progresses, which may make the player incapable of defeating the enemy character. On the other hand, if the strength of the enemy character does not change even when the game progresses, the player may get tired of the game, and may stop continuing the fitness exercise.

Therefore, in the present embodiment, the game system 1 increases the player parameter as the game progresses, and calculates the amount of effect based on the player parameter. In this case, even when the evaluation result of the fitness action performed by the player is not changed, since the amount of effect is increased as the game progresses, it becomes easier for the player to defeat the stronger enemy character. In the present embodiment, even if the actual exercise ability of the player is not improved very much, the player can feel the sense of achievement as if he/she has grown stronger in the game. Thus, the game system 1 can motivate the player to continuously perform the fitness action while continuing to play the game. Also, the game system 1 can motivate the player to continue playing the game by allowing the player to feel the sense of achievement through defeating the stronger enemy character.

As described above, in the present embodiment, the game system 1 determines whether or not the achievement condition (i.e., to win the battle event) has been satisfied, on the basis of the game result based on the action data and the player parameter (specifically, the game result is the vitality value, of the enemy character, decreased by the amount of damage). Then, the game system 1 progresses the game as the battle event has been achieved, and updates the player parameter so that the achievement condition is more easily satisfied (i.e., so that the value of the player parameter is increased to make the player able to defeat the enemy character more easily) as the game progresses. In other words, the game system 1 updates the player parameter such that the amount of decrease in the vitality value of the enemy character increases as the game progresses, in the case where the action data acquired during the battle event is the same (e.g., the content of the fitness action performed by the player is the same). Thus, the player is motivated to continuously perform the fitness action while continuing to play the game.

2-4. Setting of Number of Waiting Turns

As described above, in the present embodiment, the number of waiting turns is set on a fitness action. When a fitness action has been selected in the selection event in the attack turn described above, the game system 1 makes this fitness action unselectable until a period corresponding to the number of waiting turns set on this fitness action passes from the present turn. For example, it is assumed that the number of waiting turns is set to 2 for the fitness action of "overhead pushing". At this time, when the player has selected "overhead pushing", the game system 1 does not present "overhead pushing" as an option in selection events in two attack turns subsequent to the attack turn in which the player has performed the fitness action of "overhead pushing". That is, in the two attack turns, the player will select a fitness action from options other than "overhead pushing".

In the case where, in a certain attack turn, all the fitness actions, of the fitness actions that are selectable options if there is no restriction by the number of waiting turns, are not selectable due to the number of waiting turns, the game system 1 may skip this attack turn and may perform a defense turn. Meanwhile, in the case where a certain fitness action is subjected to restriction by the number of waiting turns, this restriction may be canceled to make the fitness action selectable when the player character 401 uses a predetermined item.

In the present embodiment, when a certain fitness action has been designated one time as a fitness action to be performed in a fitness event, the game system 1 imposes restriction by the number of waiting turns on this fitness action. In another embodiment, when a certain fitness action has been designated a plurality of times not less than 2, the game system 1 may impose restriction by number of waiting turns on this fitness action. Regarding the predetermined number of times, a predetermined number of times may be set for each of the plurality of types of fitness actions, or the same predetermined number of times may be set for the respective fitness actions.

As described above, in the present embodiment, as for the fitness action (in other words, fitness event) that has been designated a predetermined number of times (one time in the present embodiment), the game system 1 restricts this fitness action from being designated until the condition for making this fitness action able to be designated again (i.e., the number of waiting turns having elapsed) is satisfied. When the player continuously performs the same fitness action, the player uses the muscle strength of the same part of the body, which may make the player tired. Meanwhile, in the present embodiment, the likelihood that the player gets tired through performing only a specific fitness action, can be reduced. Further, since the player cannot repeatedly perform the same fitness action, the player will perform the battle event taking into account the combination of fitness actions to be performed in a plurality of attack turns. Thus, strategic characteristics of the game can be improved.

In the present embodiment, it can be said that the condition for a certain fitness action to be able to be designated again is a condition regarding the number of times a fitness event related to another fitness action different from the certain fitness action has been executed after a fitness event related to the certain fitness action was executed last. In another embodiment, the condition for a fitness action to be able to be designated again may be a condition regarding an elapsed time from when a fitness event related to this fitness action was executed last. For example, instead of the number of waiting turns, a waiting time may be set for each fitness action. At this time, when a fitness action has been selected in a selection event, the game system 1 makes this fitness action unselectable during a period until the waiting time has passed from when the fitness event related to this fitness action was ended. In this case, as in the present embodiment, the likelihood that the player gets tired through performing only a specific fitness action, can be reduced. In addition, the player is allowed to perform many types of fitness actions using the whole body in a well-balanced manner.

In another embodiment, the condition for a fitness action to be able to be designated again may include at least one of the condition regarding the number of times and the condition regarding the elapsed time.

In another embodiment, the condition for a fitness action to be able to be designated again may be a condition other than those described above. The condition for a fitness action to be able to be designated again may be, for example, a condition regarding an amount of damage that the player character 401 has given to the enemy character, or an amount of damage that the player character 401 has received from the enemy character. Specifically, the game system 1 may display a gauge indicating the amount of damage on the display device, and may make the fitness action able to be designated again when the gauge has been filled up. This condition can also reduce the likelihood that the player performs only a specific fitness action, as in the present embodiment.

The condition for a fitness action to be able to be designated again may be that the player has performed a specific fitness action different from this fitness action. For example, the condition for a fitness action using the arms to be able to be designated again may be that the player has performed a fitness action using the legs. This condition can also reduce the likelihood that the player performs only a specific fitness action, as in the present embodiment.

In the present embodiment, the condition for being able to be designated again (specifically, the number of waiting turns) is set for each type of fitness action (in other words, each type of fitness event). Thus, the condition can be set taking into account the magnitude of burden on the player due to the fitness action, for each type of fitness action, and therefore, an appropriate condition can be set for each type of fitness action.

In the present embodiment, in a selection event, the game system 1 designates one type of fitness action from among a plurality of types of fitness actions in response to a selection instruction performed by the player. In another embodiment, in the selection event, the game system 1 may automatically designate one type of fitness action from among the plurality of types of fitness actions independently of an instruction performed by the player. Also, in this embodiment, a condition for being able to be designated again may be set for the fitness action. Even in this case, as in the present embodiment, the likelihood that the player gets tired through performing only a specific fitness action, can be reduced.

2-5. Setting of Physical Information

In the present embodiment, before a battle event is started, the game system 1 sets physical information indicating the physical ability and/or the physical condition of the player. Then, the game system 1 executes the battle event by using the physical information. For example, based on the physical information regarding the player, the game system 1 executes a fitness event and calculates an evaluation result of a fitness action. In this case, since the battle event is executed according to the physical information of each player, the player can easily perform a fitness action according to his/her physical ability and/or physical condition. Hereinafter, processing using the physical information will be described in detail.

Exercise Intensity Information

In the present embodiment, the game system 1 sets exercise intensity information as the physical information. The exercise intensity information is information indicating an exercise intensity supposed to be appropriate for the player. In the present embodiment, the exercise intensity information indicates any of "light", "normal", and "hard".

The exercise intensity information is set before the battle event is started. For example, the game system 1 sets the exercise intensity information when the game is started after start-up of the game program. At this time, the game system 1 asks the player about his/her physical condition on the day. For example, the game system 1 makes questions such as "How are you feeling today?", "Aren't you tired?", and "Are you hurt anywhere?". Then, based on the player's answers to the questions, the game system 1 sets the exercise intensity information. When it is supposed from the player's answers that the player may feel unwell or may be tired, the game system 1 sets information indicating "light" as the exercise intensity information.

In the present embodiment, based on the exercise intensity information, the game system 1 sets the unit number of times of action for each of fitness actions to be performed in the battle event. That is, when the exercise intensity information is "normal", the game system 1 sets the unit number of times of action for each fitness action to a reference value defined in the game program. When the exercise intensity information is "light", the game system 1 sets the unit number of times of action for each fitness action to a value smaller than the reference value. When the exercise intensity information is "hard", the game system 1 sets the unit number of times of action for each fitness action to a value larger than the reference value.

In another embodiment, the game system 1 may use, as the exercise intensity information, the information indicating the unit number of times of action. In this case, the game system 1 may cause the player to input the unit number of times of action, instead of asking the player about his/her physical condition on the day.

As described above, in the present embodiment, the game system 1 changes the amount of the fitness action to be performed by the player during the battle event (specifically, the unit number of times of action) in accordance with the physical information (specifically, the exercise intensity information). Thus, the player can perform the fitness action with a load according to his/her physical condition on the day.

In another embodiment, the amount of the fitness action to be performed by the player during the fitness event may be the time to maintain the keep posture when the fitness action belongs to the keep action group. That is, the game system 1 may change the time according to the physical information. In this case, as in the present embodiment, the player can perform the fitness action with a load according to his/her physical condition on the day.

Exercise Ability Information

In the present embodiment, the game system 1 sets, as the physical information, exercise ability information indicating the exercise ability of the player. In the present embodiment, the exercise ability information is information indicating a larger numerical value as the exercise ability is higher.

The exercise ability information is set before the battle event is started. For example, the game system 1 sets the exercise ability information regarding the player when the player starts the game first (e.g., when save data is created) after start-up of the game program. At this time, the game system 1 causes the player to actually perform fitness exercise, and calculates an evaluation result for the fitness exercise performed by the player. Based on the calculated evaluation result, the game system 1 sets a numerical value indicated by the exercise ability information. Specifically, the exercise ability information is set such that the higher the evaluation result is, the larger the numerical value is. Thus, the physical information may be determined on the basis of the action data based on the fitness action performed by the player before execution of the battle event. Thus, the game system 1 can obtain highly accurate physical information, based on the fitness action actually performed by the player. The method of setting the exercise ability information is optional. For example, in another embodiment, the game system 1 may ask the player questions (e.g., about his/her age) for estimating his/her exercise ability, and may set the exercise ability information based on the answers to the questions.

In the present embodiment, based on the exercise ability information, the game system 1 calculates an amount of effect (i.e., an amount of damage or an amount of recovery) achieved by an action of the player character 401 associated with the fitness action. The game system 1 calculates the amount of effect such that the larger the numerical value indicated by the exercise ability information is, the smaller the amount of effect is. The specific method for changing the amount of effect according to the exercise ability information is optional. For example, the game system 1 may change the basic effect value according to the exercise ability information, or may change the fitness action evaluation method according to the exercise ability information (specifically, may make it more difficult to obtain a good evaluation as the numerical value indicated by the exercise ability information is larger). In addition, the game system 1 may multiply the evaluation score calculated by the evaluation method described in "[2-3. Game processing based on fitness action]" by a coefficient according to the exercise ability information, thereby calculating the final evaluation score.

As described above, in the present embodiment, the game system 1 decreases the vitality value of the enemy character, based on the action data obtained during the fitness event and on the physical information (specifically, the exercise ability information). Thus, the game system 1 can adjust the game result according to the physical ability of the player. For example, even a player whose exercise ability is poor can easily progress the game. Therefore, the player can be motivated to continuously perform the fitness action while continuing to play the game.

In another embodiment, the game system 1 may change the amount of the fitness action to be performed by the player during the fitness event (specifically, the unit number of times of action) based on the exercise ability information. Thus, the player can perform the fitness action with a load according to his/her physical ability.

Action Reference Value

In the present embodiment, the game system 1 sets action reference values as the physical information. In the present embodiment, the action reference values include a pushing reference value and a bending reference value. The pushing reference value is a value used for evaluation regarding a pushing action to the ring-shaped extension apparatus 5 in the battle event. The bending reference value is a value used for evaluation regarding an action of bending knees like a squat in the battle event.

The process of setting the action reference value is executed before the battle event is started. For example, the process of setting the action reference value is executed when the game is started after start-up of the game program.

In the process of setting the action reference value, the game system 1 causes the player to perform an action of pushing the ring-shaped extension apparatus 5 inward. For example, the game system 1 displays a message "Push the ring inward" on the display device to urge the player to perform an action of pushing the ring-shaped extension apparatus 5 inward. In response to this message, the player performs an action of pushing the grip covers 203 and 204 of the ring-shaped extension apparatus 5 inward with both hands. When the action has been performed, the game system 1 calculates an amount of deformation of the ring-shaped extension apparatus 5. Based on the calculated amount of deformation, the game system 1 sets the pushing reference value. For example, the pushing reference value may be set to a maximum value of the amount of deformation during the above action, or may be set to a value obtained by multiplying the maximum value by a predetermined coefficient (e.g., 0.8).

Meanwhile, in the process of setting the action reference value, the game system 1 causes the player to perform an action of bending the knees. For example, the game system 1 displays a message "Bend your knees" on the display device to urge the player to perform an action of bending the knees. In response to this message, the player performs an action of bending the knees like a squat. When the action has been performed, the game system 1 calculates an inclination of the left controller 3. Based on the calculated inclination, the game system 1 sets the bending reference value. For example, the bending reference value may be set to a maximum value of the inclination during the above action, or may be set to a value obtained by multiplying the maximum value by a predetermined coefficient (e.g., 0.8).

In the battle event, the game system 1 uses the pushing reference value in the following process, for example. First, in the case where the action of pushing the ring-shaped extension apparatus 5 inward is performed as a predetermined exercise of a fitness action that belongs to the repeat action group described above, the game system 1 uses the pushing reference value in a process of calculating an evaluation score regarding the fitness action. That is, the game system 1 determines whether or not the action of pushing the ring-shaped extension apparatus 5 inward has been performed, depending on whether or not the amount of deformation of the ring-shaped extension apparatus 5 is equal to or more than the pushing reference value. Further, the game system 1 uses the pushing reference value in a process of calculating an evaluation score regarding a fitness action that belongs to the keep action group described above. That is, the game system 1 uses the pushing reference value as an ideal value to be used for calculation of the evaluation coefficient.

In the battle event, the game system 1 uses the bending reference value in the following process, for example. First, in the case where the action of bending the knees is performed as a predetermined exercise of a fitness action that belongs to the repeat action group described above, the game system 1 uses the bending reference value in a process of calculating an evaluation score regarding the fitness action. That is, the game system 1 determines whether or not the action of bending the knees has been performed, depending on whether or not the inclination of the left controller 3 is equal to or greater than the bending reference value. Further, the game system 1 uses the bending reference value in a process of calculating an evaluation score regarding a fitness action that belongs to the keep action group described above. That is, the game system 1 uses the bending reference value as an ideal value to be used for calculation of the evaluation coefficient.

For example, when the muscle strength of the player is poor, the pushing reference value is set to a small value, and the bending reference value is set to a value corresponding to the state where the knees are not deeply bent. Therefore, in the battle event, the game system 1 determines that the action of pushing the ring-shaped extension apparatus 5 inward has been performed, in response to the player slightly deforming the ring-shaped extension apparatus 5, and determines that the action of bending the knees has been performed, in response to the player slightly bending the knees. On the other hand, when the muscle strength of the player is great, the pushing reference value is set to a large value, and the bending reference value is set to a value corresponding to the state where the knees are deeply bent. Therefore, in the battle event, the game system 1 determines that the action of pushing the ring-shaped extension apparatus 5 inward has been performed, in response to the player greatly deforming the ring-shaped extension apparatus 5, and determines that the action of bending the knees has been performed, in response to the player deeply bending the knees. Thus, in the present embodiment, the game system 1 can appropriately perform determination and evaluation regarding the action of pushing the ring-shaped extension apparatus 5 and the action of being the knees, according to the muscle strength of the player.

As described above, in the present embodiment, the game system 1 calculates the evaluation result of the fitness action performed by the player during the fitness event, based on the action data acquired during the fitness event and on the physical information (i.e., the action reference value). In addition, the game system 1 determines whether or not the achievement condition of the battle event has been satisfied, on the basis of the game result based on the evaluation result. Thus, the game system 1 can evaluate the fitness action with high accuracy by taking into account the physical ability of the player.

In another embodiment, the game system 1 may change the load (specifically, the unit number of times of action) on the fitness action that the player is caused to perform during the battle event, according to the physical information (specifically, the action reference value). Thus, the player can perform the fitness action with a load taking into account his/her physical ability. As an example of changing the load, the game system 1 may change a threshold value used for determining that a fitness action has been performed. For example, in the case where an action of pushing the ring-shaped extension apparatus 5 inward is performed as the fitness action, the game system 1 may change a threshold value, regarding the amount of pushing, which is used for determining that the fitness action has been performed. Meanwhile, for example, in the case where a squat is performed as the fitness action, the game system 1 may change a threshold value, regarding a knee bending angle, which is used for determining that the fitness action has been performed. By changing these threshold values, the load on the fitness action that the player is caused to perform can be changed.

3. Specific Example of Information Processing in Game System

A specific example of information processing in the game system 1 will be described with reference to FIGS. 21 to 25.

3-1. Data Used for Information Processing

FIG. 21 shows examples of various data used for the information processing in the game system 1. The various data shown in FIG. 21 are stored in a storage medium (e.g., the flash memory 84, the DRAM 85, and/or a memory card attached to the slot 23) that is accessible by the main body apparatus 2.

As shown in FIG. 21, the game system 1 stores a game program therein. The game program is a game program for executing a game application according to the present embodiment. The game program is stored in, for example, the flash memory 84 and/or the memory card attached to the slot 23.

Further, as shown in FIG. 21, the game system 1 stores fitness action content data therein. The fitness action content data may be stored in the storage medium together with the game program. The fitness action content data represents information indicating the content of a fitness action, for each fitness action. For example, regarding the fitness actions that belong to the keep action group, the fitness action content data include data indicating: threshold values (e.g., threshold values regarding inclinations of the controllers) for determining that the player has taken the start posture and the keep posture described above; a time for maintaining the keep posture; and the like. For example, regarding the fitness actions that belong to the repeat action group, the fitness action content data includes data indicating: a threshold value used for determining that the player has performed a predetermined exercise to be repeatedly performed; the number of times to repeatedly perform the exercise; and the like. For example, regarding the fitness actions that belong to the pose action group, the fitness action content data includes data indicating threshold values for determining that the player has taken the first posture and the second posture described above, and the like. Further, the fitness action content data includes data indicating the unit number of times of action for each fitness action. In the present embodiment, the fitness action content data includes, for one fitness action, data indicating three types of unit number of times of action according to the content of the exercise intensity information (i.e., "light", "normal", and "hard"). In addition, the fitness action content data includes data indicating the above-described "part corresponding to a fitness action" associated with each fitness action.

Further, the fitness action content data includes data indicating, for each fitness action, information (including the basic effect value described above) indicating the content of an action of the player character 401 associated with the fitness action.

Further, as shown in FIG. 21, the game system 1 includes physical information data, player parameter data, player character data, and enemy character data. These data are generated and used in information processing (see FIG. 22 to FIG. 25) to be executed by the game program. In addition to the data shown in FIG. 21, the storage medium has, stored therein, various types of data that are used in the information processing to be executed by the game program.

The physical information data indicates the above-described physical information. In the present embodiment, the physical information includes the exercise intensity information and the pushing reference value described above. The player parameter data indicates the above-described player parameter. The player character data indicates various types of parameters (specifically, the physical strength, etc.) regarding the player character 401. The enemy character data indicates, for each enemy character, various types of parameters (specifically, the physical strength, etc.) regarding the enemy character.

3-2. Processing Executed in Game System

FIG. 22 to FIG. 25 are flowcharts showing an example of information processing executed by the game system 1. A series of processes shown in FIG. 22 to FIG. 25 is started in response to, for example, an instruction to start the game, performed by the player after execution of the game program has been started.

In the present embodiment, it is assumed that the processor 81 of the main body apparatus 2 executes the game program stored in the game system 1, thereby executing the processes in steps shown in FIG. 22 to FIG. 25. However, in another embodiment, a part of the processes in the steps may be executed by a processor (e.g., a dedicated circuit or the like) other than the processor 81. When the game system 1 is communicable with another information processing apparatus (e.g., a server), a part of the processes in the steps shown in FIG. 22 to FIG. 25 may be executed by the information processing apparatus. For example, when the game system 1 is communicable with a server, a part of game processing (e.g., a game control process in step S12 described below) may be executed by the server. Further, for example, a part of a process of determining an action of the player based on action data may be executed by a controller that transmits the action data. The processes in the steps shown in FIG. 22 to FIG. 25 are merely examples. The order of the processes in the steps may be changed, and other processes may be executed in addition to (or instead of) the processes in the steps as long as similar results can be obtained.

The processor 81 executes the processes in the steps shown in FIG. 22 to FIG. 25 by using a memory (e.g., the DRAM 85). That is, the processor 81 stores, in the memory, information (in other words, data) obtained in each process step, and reads out the information from the memory when using the information for the subsequent process steps.

Figure 22:
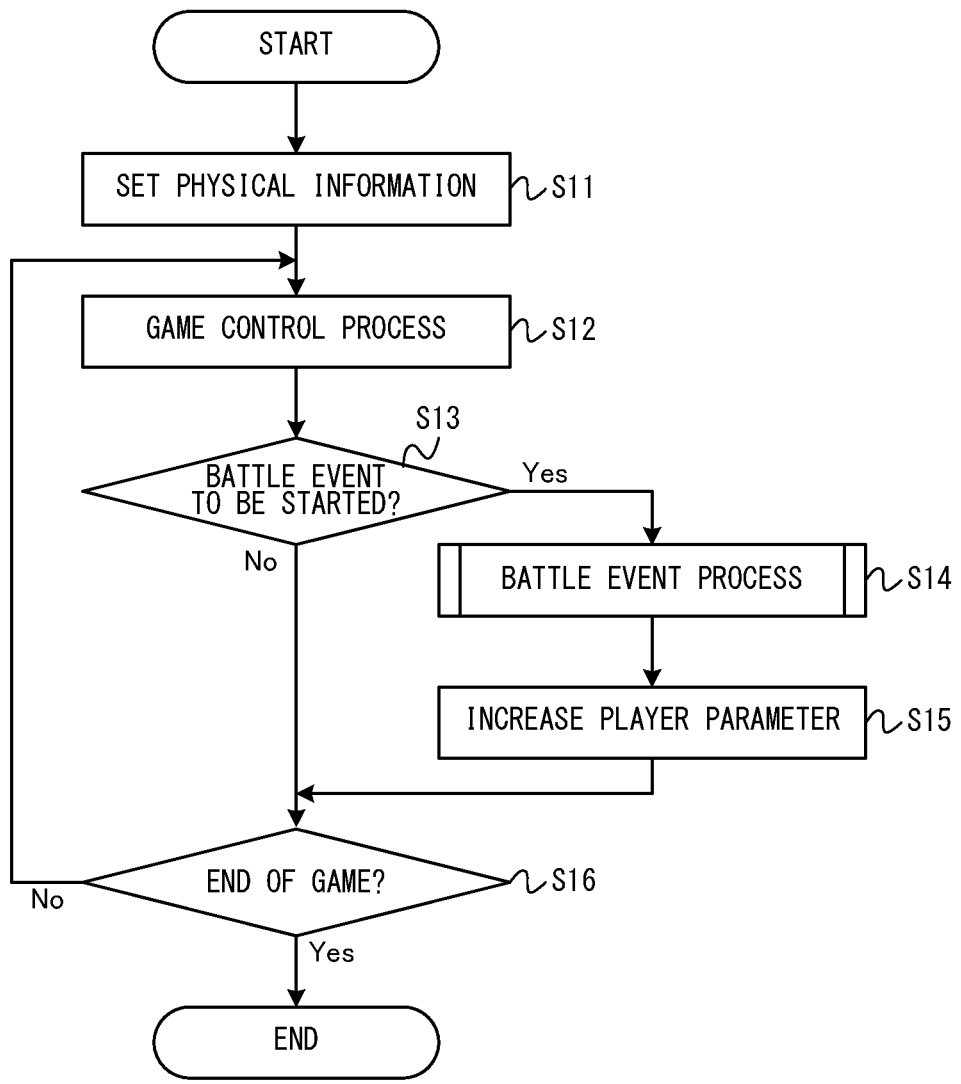
FIG. 22 is a flowchart showing an example of information processing executed by the non-the limiting game system 1.

In step S11 shown in FIG. 22, the processor 81 sets physical information. Specifically, the processor 81 specifies, as the physical information, exercise intensity information and pushing reference value through the method described in "[2-5. Setting of physical information]", and stores physical information data indicating the specified physical information in the memory. In addition, with reference to the fitness action content data stored in the memory, the processor 81 specifies the unit number of times of action for each fitness action, based on the set exercise intensity information. Next to the process in step S11, the process in step S12 is executed. The game is started in and after step S12.

In step S12, the processor 81 executes a game control process. As the game control process, the processor 81 accepts an instruction from the player, executes a game process based on the instruction, and displays a game image representing the result of the game process on the display device. The processor 81 performs, as an example of the game control process, a process of moving the player character 401 on the game map, based on the instruction of the player. Further, when the player character 401 has won in a predetermined battle event, the processor 81 executes, as a game control process, a process of progressing the game. The game control process is temporarily interrupted at an appropriate timing, and the process in step S13 is executed.

In step S13, the processor 81 determines whether or not to start a battle event. For example, in the game control process, when the player character 401 meets an enemy character on the game map, the processor 81 determines to start the battle event. On the other hand, when the player character 401 does not meet an enemy character on the game map, the processor 81 determines not to start the battle event. When the determination result in step S13 is positive, the process in step S14 is executed. When the determination result in step S13 is negative, the process in step S16 described below is executed.

In step S14, the processor 81 executes a battle event process as a game process for executing the battle event. The battle event process will be described in detail with reference to FIG. 23 to FIG. 25.

Figure 23:
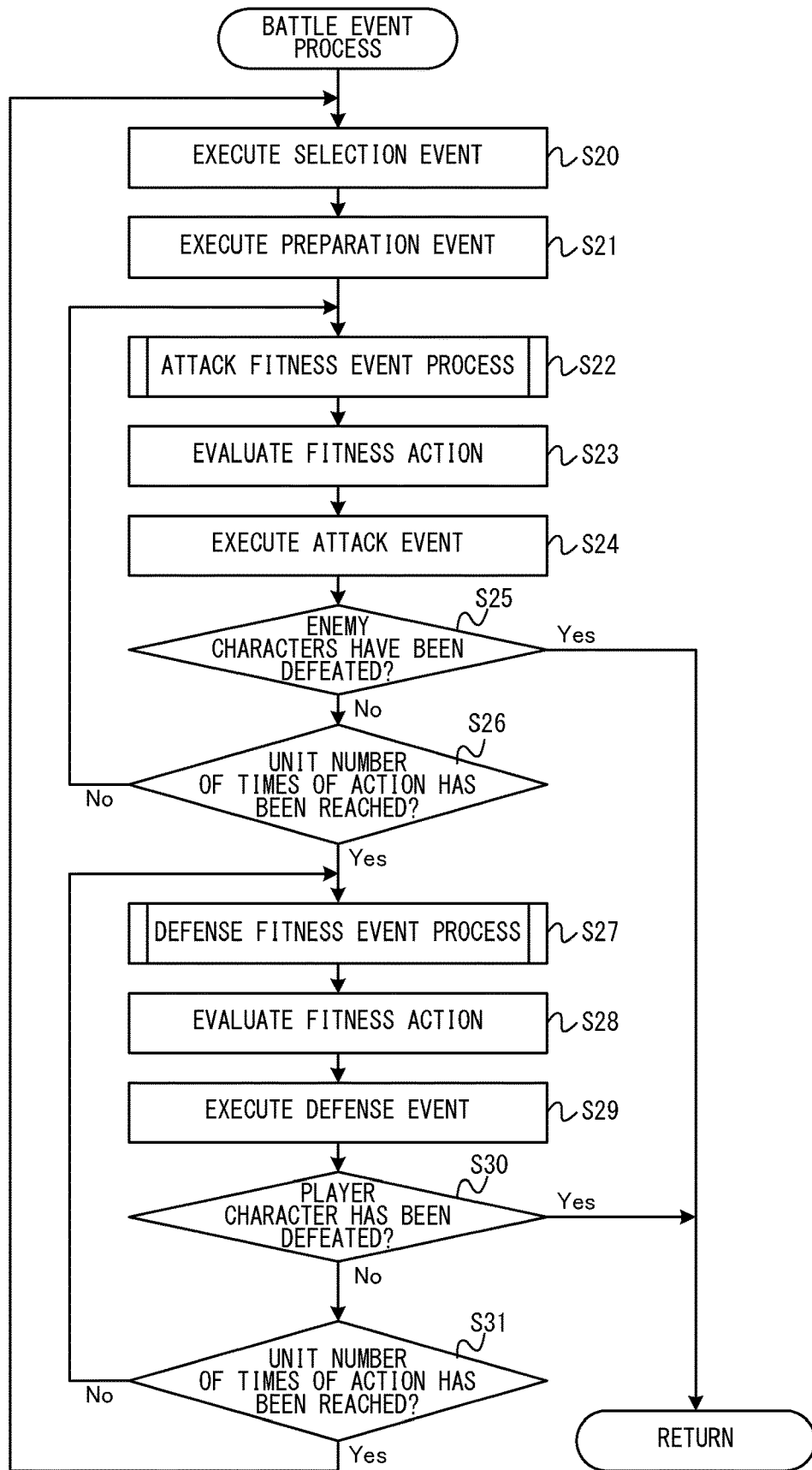
FIG. 23 is a sub-flowchart showing an example of a specific flow of a battle event process in step S14 shown in FIG. 22.

FIG. 23 is a sub-flowchart showing an example of a specific flow of the battle event process in step S14 shown in FIG. 22. In the battle event process, first, a series of processes in steps S20 to S26 is executed as a game process in an attack turn.

In step S20, the processor 81 executes a selection event as described above. That is, the processor 81 displays the selection image (see FIG. 15) on the display device, accepts a switching instruction and a selection instruction performed by the player, and designates a fitness action selected by the player. Next to step S20, the process in step S21 is executed.

In step S21, the processor 81 executes a preparation event as described above. In the preparation event, the processor 81 displays the preparation action image (see FIG. 16) on the display device, and acquires action data. In the present embodiment, the processor 81 acquires operation data from each of the controllers 3 and 4. Specifically, the processor 81 acquires right controller operation data, left controller operation data, and ring operation data, each containing action data.

In the preparation event, based on the action data, the processor 81 determines whether or not the player has taken the posture to start of the fitness action. As described above, in the present embodiment, this determination is performed depending on whether or not the player has taken the posture-with-check. When performing the determination, the processor 81 refers to the fitness action content data stored in the memory, according to need. Upon determining that the player has taken the posture to start the fitness action, the processor 81 ends the process in step S21, and executes the process in step S22.

In step S22, the processor 81 executes an attack fitness event process. The attack fitness event process is a process of executing a fitness event in the attack turn. Hereinafter, the attack fitness event process will be described in detail with reference to FIG. 24.

Figure 24:
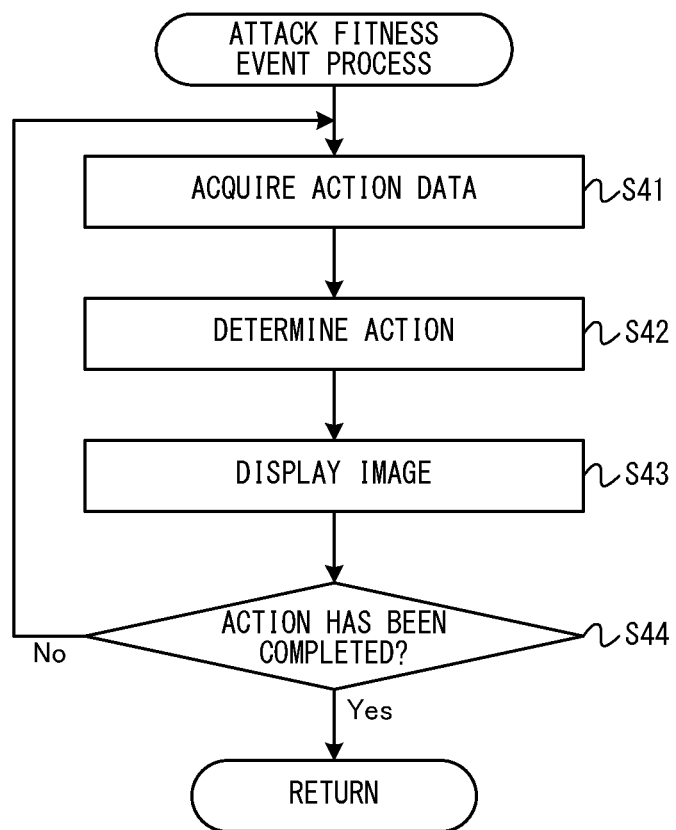
FIG. 24 is a sub-flowchart showing an example of a specific flow of an attack fitness event process in step S22 shown in FIG. 23.

FIG. 24 is a sub-flowchart showing an example of a specific flow of the attack fitness event process in step S22 shown in FIG. 23. In the attack fitness event process, in step S41, the processor 81 acquires action data in the same manner as described for step S21. Next to step S41, the process in step S42 is executed.

In step S42, based on the action data acquired in step S41, the processor 81 determines the action of the player. The processor 81 determines, for example, to what extent the player is pushing the ring-shaped extension apparatus 5 inward and/or to what extent the player bends the knees, and the like. In the processes in step S42 and step S44 described below, the processor 81 refers to the fitness action content data and the physical information data stored in the memory, according to need. Next to step S42, the process in step S43 is executed.

In step S43, the processor 81 displays the game image (see FIG. 17) in the fitness event on the display device. At this time, the processor 81 causes the player character 401 to act in response to the action of the player determined in step S42, and displays a game space including the player character 401. In addition, the processor 81 displays the model action image 433, the number-of-times-of-action image 434, the remaining-number-of-times image 435, and the calorie consumption image 436 described above.

In step S44, the processor 81 determines whether or not one fitness action of the player has been completed. This determination can be performed based on the action of the player determined in step S42. When the determination result in step S44 is negative, the process in step S41 is executed again. Thereafter, the series of processes in steps S41 to S43 is repeatedly executed until the determination result in step S44 becomes positive. In the present embodiment, the series of processes in steps S41 to S43 is executed once every predetermined time (e.g., 1 frame time). When the determination result in step S44 is positive, the processor 81 ends the attack fitness event process shown in FIG. 24.

Referring back to FIG. 23, in step S23 next to step S22, the processor 81 evaluates the fitness action performed by the player in the fitness event in step S22. Specifically, the processor 81 calculates an evaluation result (specifically, an evaluation score) of the fitness action by the method described in "[2-3. Game processing based on fitness action]". Next to step S23, the process in step S24 is executed.

In step S24, the processor 81 executes an attack event as described above. In the attack event, the processor 81 calculates an amount of damage that is given to an enemy character through an attack to the enemy character by the player character 401, and displays, on the display device, an image representing a state where the enemy character is damaged (see FIG. 18). The calculation of the amount of damage is performed according to the method described in "[2-3. Game processing based on fitness action]". At this time, the processor 81 decreases the physical strength of the attacked enemy character according to the amount of damage, and updates the enemy character data stored in the memory so as to indicate the decreased physical strength. Next to step S24, the process in step S25 is executed.

In step S25, with reference to the enemy character data stored in the memory, the processor 81 determines whether or not all the enemy characters that appear in the battle event have been defeated. When the determination result in step S25 is positive, the processor 81 ends the battle event process shown in FIG. 23. When the determination result in step S25 is negative, the process in step S26 is executed.

In step S26, the processor 81 determines whether or not the fitness action has been performed by the unit number of times of action in this attack turn. The unit number of times of action used for this determination is the unit number of times of action specified in step S11. When the determination result in step S26 negative, the processor 81 executes the process in step 22 again. When the determination result in step S26 is positive, the process in step S27 is executed. After the game process in the attack turn has been performed through the series of processes in steps S20 to S26, a series of processes in steps S27 to S29 is executed as a game process in a defense turn.

In step S27, the processor 81 executes a defense fitness event process. The defense fitness event process is a process for executing a fitness event in a defense turn. Hereinafter, the defense fitness event process will be described in detail with reference to FIG. 25.

Figure 25:
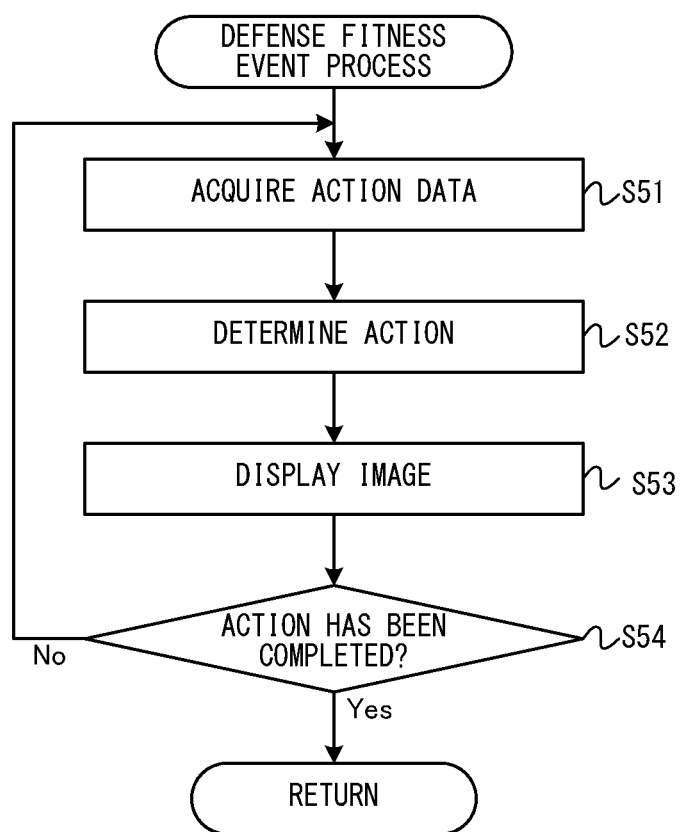
FIG. 25 is a sub-flowchart showing an example of a specific flow of a defense fitness event process in step S27 shown in FIG. 23.

FIG. 25 is a sub-flowchart showing an example of a specific flow of the defense fitness event process in step S27 shown in FIG. 23. In the defense fitness event process, in step S51, the processor 81 acquires action data. In step S52, the processor 81 determines an action of the player. Further, in step S53, the processor 81 displays, on the display device, the game image (see FIG. 19) in the fitness event. A series of processes in steps S51 to S53 is executed in the same manner as the series of processes in steps S41 to S43 described above. Next to step S53, the process in step S54 is executed.

In step S54, the processor 81 determines whether or not one fitness action of the player has been completed. This determination can be performed based on the action of the player determined in step S52. When the determination result in step S54 is negative, the process in step S51 is executed again. Thereafter, the series of processes in steps S51 to S54 is repeatedly executed until the determination result in step S54 becomes positive. When the determination result in step S54 is positive, the processor 81 ends the defense fitness event process shown in FIG. 25.

Referring back to FIG. 23, in step S28 next to step S27, the processor 81 evaluates the fitness action performed by the player in the fitness event in the defense fitness event process in step S27. The process in step S28 is executed in the same manner as the process in S23 described above. Next to step S28, the process in step S29 is executed.

In step S29, the processor 81 executes a defense event. In the defense event, the processor 81 calculates an amount of damage that is given to the player character 401 through an attack to the player character 401 by an enemy character, and displays, on the display device, an image representing a state where the player character 401 is damaged (see FIG. 20). The calculation of the amount of damage is performed according to the method described in "[2-3. Game processing based on fitness action]". At this time, the processor 81 decreases the physical strength of the player character 401 according to the amount of damage, and updates the player character data stored in the memory so as to indicate the decreased physical strength. Next to step S29, the process in step S30 is executed.

In step S30, the processor 81 determines whether or not the player character has been defeated, with reference to the player character data stored in the memory. When the determination result in step S30 is positive, the processor 81 ends the battle event process shown in FIG. 23. When the determination result in step S30 is negative, the process in step S31 is executed.

In step S31, the processor 81 determines whether or not the fitness event has been executed by the unit number of times of action in this defense turn. The unit number of times of action used in this determination is the unit number of times of action specified in step S11. When the determination result in step S31 is negative, the processor 81 executes the process in step S27 again. When the determination result in step S31 is positive, the process in step S20 is executed again. That is, the defense turn is ended, and an attack turn is executed again. This is the end of the description of the battle event process in step S14.

Referring back to FIG. 22, in step S15 next to step S14, the processor 81 increases the player parameter under a predetermined condition. The condition of updating the player parameter is optional. As described above, the player parameter may be increased on the condition that the player character 401 beats the enemy character in the battle event, or the condition that the game story has proceeded (for example, that the player character 401 has entered a new game stage). When the player parameter has been increased in the process of step S15, the processor 81 updates the player parameter data stored in the memory so as to indicate the increased value. Next to step S15, the process in step S16 is executed.

In step S16, the processor 81 determines whether or not to end the game. For example, the processor 81 determines whether or not an instruction to end the game has been performed by the user. When the determination result in step S16 is negative, the process in step S12 is executed again. Thereafter, the series of processes in steps S11 to S16 is repeatedly performed until it is determined in step S16 to end the game. When the determination result in step S16 is positive, the processor 81 ends the information processing in the game application.

4. Function and Effect of Present Embodiment, and Modifications

In the above embodiment, an information processing program (for example, the game program) executed by a computer (for example, the processor 81) of an information processing apparatus (for example, the main body apparatus 2) causes the computer to function as the following means:

acquisition means for acquiring action data based on an output of a sensor (for example, a strain gauge, an acceleration sensor, and/or an angular velocity sensor) according to a fitness action performed by a player (step S31, S41); and game event execution means for executing a game event (for example, a battle event) in which an achievement condition is set (step S14).

The game event execution means includes the following means:

action designation means for designating at least one type of fitness event from among a plurality of types of fitness events, each fitness event causing the player to perform a fitness action (step S20);

first fitness event execution means for executing, during the game event, a first fitness event (for example, a battle event in an attack turn) that causes the player to perform a fitness action corresponding to the designated fitness event until an ending condition is satisfied (step S22); and achievement determination means for determining whether or not the achievement condition has been satisfied, based on action data acquired during the first fitness event (step S25).

The game event execution means repeats designation and execution of the first fitness event until it is determined that the achievement condition has been satisfied (see FIG. 23).

According to the above configuration, the player can be caused to perform the fitness action during the game event, with a goal of achieving the game event. Thus, the player can be caused to perform the fitness action toward the goal of achieving the game event, and therefore, the player can be motivated to perform the fitness action.

In the above embodiment, the game event is a battle event of fighting a battle against an enemy character, but may be any game event. In another embodiment, the game event may be, for example, a game event in which a player character performs a predetermined task.

The achievement condition set in the game event is a condition for determining that the player has achieved the game event (or has succeeded in the game event). In the above embodiment, the achievement condition is to win the battle. That is, the game system 1 determines whether or not the condition regarding a vitality value of the enemy character has been satisfied as the achievement condition. In this case, the player can be caused to perform the fitness action toward the goal of defeating the enemy character on the game, whereby the player can be motivated to perform the fitness action.

The achievement condition may be any condition that is determined based on the action data acquired during the fitness event. For example, in another embodiment, in the case where a game event, in which a player character acquires an item according to a fitness action performed by the player, is executed, the achievement condition may be that the player character acquires a predetermined number of items. By setting a condition regarding the game as the achievement condition, the player can be caused to perform the fitness action as if he/she is playing the game. The achievement condition is not limited to the condition regarding the game, but may be a condition that a predetermined number of times of fitness events are performed during the game event, for example. The phrase "determined based on the action data" means both performing the determination by directly using the action data (e.g., determining whether or not the action data has satisfied the condition), and performing the determination by indirectly using the action data (e.g., determining whether or not a game result calculated by using the action data has satisfied the condition).

In the above embodiment, the information processing program (for example, the game program) executed by the computer (for example, the processor 81) of the information processing apparatus (for example, the main body apparatus 2) may also cause the computer to function as the following means:

acquisition means for acquiring action data based on an output of a sensor (for example, a strain gauge, an acceleration sensor, and/or an angular velocity sensor) according to a fitness action performed by a player (step S31, S41); and game processing means for progressing a game according to achievement of a battle event of fighting a battle with an enemy character (steps S12 to S16).

The game event execution means includes the following means:

fitness event execution means for executing a fitness event that causes the player to perform a fitness action during the battle event (step S22); and vitality value update means for decreasing a vitality value of the enemy character in a case where the action data acquired during the fitness event satisfies a condition according to the fitness action (e.g., in a case where it is determined, based on the action data, that the fitness action has been performed by the player) (step S24).

When the vitality value of the enemy character has satisfied a predetermined condition (specifically, when the vitality value has become 0), the game processing means progresses the game upon determining that the battle event has been achieved (step S25).

The vitality value of the enemy character may be a value indicated by data that is used as a parameter of the enemy character in the information processing executed during the game, or may be a value indicated by information (e.g., the length of a gauge indicating the vitality value) that is explicitly or impliedly presented to the player as one indicating the vitality value of the enemy character in the game.

As described above, in the above embodiment, a fitness action, which is an action different from an attack, is used as an instruction to perform an attack in a game. Conventionally, there have been known a game in which a player character is caused to perform an attack with a sword in response to a controller being swung like a sword by a player, and a game in which a player character is caused to perform a punch attack in response to a controller being moved by a player as if the player makes a punch. In these conventional games, the player existing in the real world is caused to perform, as an attack instruction, an action that is the same as or similar to an attack action to be performed by the player character in the game. The game according to the above embodiment is different from the conventional games in that the player is caused to perform, as an attack instruction, a fitness action different from an attack action in the game, and therefore, cannot be retrieved from the conventional games.

Further, according to the above embodiment, since the fitness action is used as an instruction for performing an attack in the game, the motivation on the game to "defeat the enemy character and progress the game" becomes the motivation for the player to perform the fitness action. Thus, the player can be motivated to perform the fitness action in the game.

Further, in the above embodiment, the game system 1 decreases the vitality value corresponding to the player in response to the fitness action performed by the player during the fitness event (step S46). Then, when the vitality value corresponding to the player has satisfied the predetermined condition, the game system 1 determines that the player has been defeated in the battle event and ends the battle event (step S28). In this case, the player can be caused to perform the fitness action while allowing the player to enjoy the sense of tension that the player cannot feel when just performing the fitness action. Therefore, according to the above embodiment, the interest of the game in which the player performs the fitness action can be enhanced. In addition, since the player performs the fitness action hard, the player can attain the exercise effect through the fitness action more effectively.

The "vitality value corresponding to the player" may be a vitality value of the player character, or a vitality value associated with the player. In the present embodiment, the player character appears in the game. In another embodiment, no player character may appear in the game. When no player character appears in the game, a vitality value of the player is set in the game, and in the battle event, the vitality value of the player may be changed according to an attack from the enemy character.

Modifications Regarding Fitness Event

In the above embodiment, an attack event, as a game event in which a game result based on a fitness action performed in a fitness event is displayed, is executed after the fitness event has ended. In this case, since the game result based on the fitness action is not displayed while the player is performing the fitness action, the player can perform the fitness action without worrying about the game result. Therefore, according to the above embodiment, the player can easily concentrate on the fitness action.

Meanwhile, in another embodiment, a fitness event and an attack event need not be executed separately in time, and the game system 1 may execute the attack event during the fitness event. For example, the game system 1 may control the player character 401 such that the player character 401 performs an attack action to the enemy character while the player is performing the fitness action.

In the fitness event, the game system 1 acquires the action data, and performs determination on the fitness action performed by the player, based on the action data. That is, it can be said that the period during which the game system 1 performs determination on the fitness action performed by the player is the period of the fitness event (even when a game event such as an attack event is executed during this period).

Further, in the above embodiment, in the fitness event, the player can start a fitness action at any timing. That is, in the fitness event, the game system 1 stands by until the player performs the fitness action, and ends the fitness event when the player has completed the fitness action. Therefore, the player can start and end the fitness action at his/her own pace, which enable the player to easily perform the fitness action.

Meanwhile, in another embodiment, the game system 1 may cause the player to perform a fitness action at a timing determined in the game. For example, in a defense turn during a battle event, the game system 1 may cause the enemy character to start an attack action at a timing independent of the fitness action of the player, and may cause the player to start the fitness action at a timing according to the attack action. For example, the game system 1 may start a fitness event at a timing according to the attack action, and may end the fitness event (e.g., may end the process of determining the fitness action) when a predetermined time has passed from the start of the fitness event.

The above embodiment has an object to motivate a player to perform a fitness action, for example, and is applicable to a game program, a game system, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a computer-executable information processing program that, when executed, causes one or more processors of an information processing apparatus to perform operations comprising:
acquiring action data based on an output of a sensor according to actions performed by a player; and
executing a game event against an opponent in which an achievement condition is set, the achievement condition being satisfied in a case where a parameter reaches a predetermined value,
executing the game event includes:
enabling the player to perform a plurality of fitness events, each fitness event prompting the player to perform a respective fitness action, wherein the different fitness actions have different basic effects associated therewith, the different basic effects enabling the parameter to be changed in different manners compared to one another; and
calculating a total effect on the parameter based on (a) an evaluation result based on action data acquired during each performed fitness event, (b) the basic effect associated with each fitness action for each performed fitness event, and (c) a player parameter set for the player in advance of the game event; and
determining whether the achievement condition has been satisfied based on the calculated total effect.

2. The storage medium according to claim 1, wherein:
during the game event, the player is prompted to perform a fitness action corresponding to a designated fitness event until an ending condition is satisfied;
the parameter is updated based on the calculated total effect; and
the player is prompted to repeat the designated fitness event until it is determined that the achievement condition has been satisfied.

3. The storage medium according to claim 1, wherein based on a selection instruction performed by the player, at least one fitness event is designated among the plurality of fitness events.

4. The storage medium according to claim 1, wherein:
the game event is a battle event of fighting a battle against an enemy character,
executing the game event includes executing an attack event of attacking the enemy character in response to the fitness action performed by the player during a first fitness event, and
the achievement condition relates to a vitality value of the enemy character.

5. The storage medium according to claim 4, wherein executing the game event further includes:
executing a second fitness event that prompts the player to perform a predetermined fitness action during the battle event; and
executing a defense event of defending against an attack from the enemy character in response to the fitness action performed by the player during the second fitness event.

6. The storage medium according to claim 5, wherein the second fitness event is determined independently of an instruction of the player.

7. The storage medium according to claim 4, wherein executing the game event includes:
decreasing a vitality value corresponding to the player in response to the fitness action performed by the player during the second fitness event; and
ending the battle event upon determining that the player has been defeated in the battle event, in a case where the vitality value corresponding to the player satisfies a predetermined condition.

8. The storage medium according to claim 1, wherein:
the information processing program, when executed, further causes the one or more processors to perform further operations comprising causing a storage medium, which is accessible by the information processing apparatus, to store therein physical information before execution of the game event, the physical information having been set before execution of the game event, and
the game event is executed using the physical information.

9. The storage medium according to claim 8, wherein the physical information includes information that is determined on the basis of action data based on a fitness action having been performed by the player before execution of the game event.

10. The storage medium according to claim 8, wherein in a first fitness event, a load on the fitness action that the player is prompted to perform during the game event varies according to the physical information.

11. The storage medium according to claim 8, wherein executing the game event further includes:
calculating the evaluation result of the fitness action performed by the player during the first fitness event, based on the action data acquired during the first fitness event and on the physical information, and
whether or not the achievement condition has been satisfied is determined based on the game result based on the evaluation result.

12. The storage medium according to claim 1, wherein:
executing the game event further includes, before the first fitness event, determining, based on the action data, whether or not the posture of the player is the posture to be taken at the start of the fitness action corresponding to a first fitness event, and
the first fitness event is started upon determination, based on the action data, that the player has taken the posture at the start of the fitness action.

13. The storage medium according to claim 1, wherein the information processing program, when executed, causes the one or more processors to perform further operations comprising increasing options of fitness actions selectable by the player as a game comprising the game event progresses, or increasing the options of the fitness actions selectable by the player when the player character acquires or uses a predetermined item.

14. An information processing apparatus comprising one or more processors, the one or more processors being configured to at least:
acquire action data based on an output of a sensor according to actions performed by a player; and
execute a game event against an opponent in which an achievement condition is set, the achievement condition being satisfied in a case where a parameter reaches a predetermined value,
wherein executing the game event includes:
enabling the player to perform a plurality of fitness events, each fitness event prompting the player to perform a respective fitness action, wherein the different fitness actions have different basic effects associated therewith, the different basic effects enabling the parameter to be changed in different manners compared to one another; and
calculating a total effect on the parameter based on (a) an evaluation result based on action data acquired during each performed fitness event, (b) the basic effect associated with each fitness action for each performed event, and (c) a player parameter set for the player in advance of the game event; and
determining whether the achievement condition has been satisfied based on the calculated total effect.

15. The information processing apparatus according to claim 14, wherein:
during the game event, the player is prompted to perform a fitness action corresponding to a designated fitness event until an ending condition is satisfied;
the parameter is updated based on the calculated total effect; and
the player is prompted to repeat the designated fitness event until it is determined that the achievement condition has been satisfied.

16. An information processing system comprising one or more processors, the one or more processors being configured to at least:
acquire action data based on an output of a sensor according to a actions performed by a player; and
execute a game event against an opponent in which an achievement condition is set, the achievement condition being satisfied in a case where a parameter reaches a predetermined value,
wherein executing the game event includes:
enabling the player to perform a plurality of fitness events, each fitness event prompting the player to perform a respective fitness action, wherein the different fitness actions have different basic effects associated therewith, the different basic effects enabling the parameter to be changed in different manners compared to one another; and
calculating a total effect on the parameter based on (a) an evaluation result based on action data acquired during each performed fitness event, (b) the basic effect associated with each fitness action for each performed fitness event, and (c) a player parameter set for the player in advance of the game event; and
determining whether the achievement condition has been satisfied based on the calculated total effect.

17. The information processing system according to claim 16, wherein:
during the game event, the player is prompted to perform a fitness action corresponding to a designated fitness event until an ending condition is satisfied;
the parameter is updated based on the calculated total effect; and
the player is prompted to repeat the designated fitness event until it is determined that the achievement condition has been satisfied.

18. An information processing method executed by an information processing system, the method comprising:
acquiring action data based on an output of a sensor according to actions performed by a player; and
executing a game event against an opponent in which an achievement condition is set, the achievement condition being satisfied in a case where a parameter reaches a predetermined value,
wherein executing the game event includes:
enabling the player to perform a plurality of fitness events, each fitness event prompting the player to perform a respective fitness action, wherein the different fitness actions have different basic effects associated therewith, the different basic effects enabling the parameter to be changed in different manners compared to one another; and
calculating a total effect on the parameter based on (a) an evaluation result based on action data acquired during each performed fitness event, (b) the basic effect associated with each fitness action for each performed fitness event, and (c) a player parameter set for the player in advance of the game event; and
determining whether the achievement condition has been satisfied based on the calculated total effect.

19. The information processing method according to claim 18, wherein:
during the game event, the player is prompted to perform a fitness action corresponding to a designated fitness event until an ending condition is satisfied;
the parameter is updated based on the calculated total effect; and
the player is prompted to repeat the fitness event until it is determined that the achievement condition has been satisfied.

20. The information processing method according to claim 18, further comprising increasing options of fitness actions selectable by the player as a game comprising the game event progresses, or increasing the options of the fitness actions selectable by the player when the player character acquires or uses a predetermined item.

* * * * *